(12) United States Patent
Fujiwara et al.

(10) Patent No.: US 7,672,039 B2
(45) Date of Patent: Mar. 2, 2010

(54) DISPLAY PANEL AND MANUFACTURING METHOD THEREFOR

(75) Inventors: Eiichi Fujiwara, Nagoya (JP); Tatsuya Ezaka, Kariya (JP); Sachiko Murakami, Okazaki (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 12/399,920

(22) Filed: Mar. 6, 2009

(65) Prior Publication Data

US 2009/0244688 A1   Oct. 1, 2009

(30) Foreign Application Priority Data

Mar. 31, 2008   (JP)   ............................. 2008-092306

(51) Int. Cl.
*G02B 26/00* (2006.01)
(52) U.S. Cl. .................... 359/296; 204/450; 204/600; 430/32; 430/35; 430/38; 264/4
(58) Field of Classification Search ............... 359/296; 204/450, 600; 430/32, 35, 38; 264/4–4.7
See application file for complete search history.

(56) References Cited

U.S. PATENT DOCUMENTS 6,686,940 B2 * 2/2004 Matsuura et al. ............ 359/296

6,750,844 B2 * 6/2004 Nakanishi .................... 359/296
2004/0263946 A9 * 12/2004 Liang et al. .................. 359/296
2005/0007650 A1 * 1/2005 Wang et al. .................. 359/296

FOREIGN PATENT DOCUMENTS

JP   2006-317608 A   11/2006
JP   2006-330707 A   12/2006

* cited by examiner

*Primary Examiner*—Evelyn A. Lester
(74) *Attorney, Agent, or Firm*—Baker Botts, LLP.

(57) ABSTRACT

To stabilize the supply of color material particles as well as reduce the wasteful amount of color material particles used and suppress deformation or damages of the outer walls of a plurality of cell regions partitioned by partition walls provided upright, an interval holding section having a first height dimension for holding an interval between a non-display area of the surface of a substrate for a display panel, which has an electrode at each of the cell regions, and a non-transfer area of the surface of an electrophotographic transfer body, is provided between the non-display area of the surface of the substrate and the non-transfer area of the surface of the transfer body, at a predetermined value at the time when the transfer body transfers the color material particles to the substrate, and the color material particles are transferred to the substrate from the transfer body while biasing the substrate toward the transfer body in such a way that the interval holding section holds the interval between the non-transfer area of the transfer body and the non-display area of the substrate at the first height dimension.

18 Claims, 16 Drawing Sheets

DISPLAY PANEL AND MANUFACTURING METHOD THEREFOR

CROSS-REFERENCE TO RELATED APPLICATION

This application claims priority to and the benefit of Japanese Patent Application No. 2008-092306, filed Mar. 31, 2008, the disclosure of which is incorporated herein by reference in its entirety.

BACKGROUND OF THE INVENTION

1. Field of the Invention

The present invention relates to a particle movement type display panel which moves color material particles between the front side and rear side of each cell to display an image, a manufacturing method therefor, and an apparatus for manufacturing the same. Specifically, the invention relates to a technique of supplying color material particles to a plurality of cells on a substrate for a display panel.

2. Description of the Related Art

There is known a particle movement type display panel in which a plurality of cell regions partitioned in a grid pattern by partition walls are provided upright between a transparent substrate and a rear-side substrate, electrodes are provided at the surface of each substrate in correspondence to the respective cell regions and color material particles with an electrostatic property are enclosed in each cell, and an electric field is applied to each cell to move color material particles between the front side and rear side cell by cell, thereby displaying different colors to display an image or a character. In order to supply color material particles into each cell of such a display panel, there is known a technique of using, for example, a transfer body as used in an electrophotographic image forming apparatus to form a supply pattern of color material particles on the transfer body, and supplying color material particles with an electrostatic property from the transfer body to the position of a target cell region (refer to, for example, Patent document 1).

There is known a technique of fixing a rear-side substrate provided with cell regions to a frame by a vacuum chuck or a mechanical chuck, and filling color material particles (refer to, for example, Patent document 2). In addition, the Patent document 1 or Patent document 2 describes the explanation for the supply pattern of color material particles on a transfer body being set smaller than the size of the opening of each cell region, the preferable height of the partition wall of the cell regions, and the particle size of the color material particles and the distribution of the particle size.

Patent document 1: Japanese Patent Application Laid-Open No. 2006-330707

Patent document 2: Japanese Patent Application Laid-Open No. 2006-317608

However, neither Patent document 1 nor Patent document 2 describes the distance of the transfer body and each cell region of the rear-side substrate at the transfer position. When the color material particles are supplied to each cell according to the description of Patent document 1 or Patent document 2, therefore, the color material particles may contact the partition wall of the cell regions and fall out of a target cell, thus wasting some color material particles and increasing the amount of usage of the color material particles in consequence. In this case, the contact of the color material particles with the partition wall of the cell regions may deform or damage the outer walls of the cell regions. Since some of the color material particles are wasted in that case, it is difficult to stably supply the color material particles to the individual cells and improve the resolution.

SUMMARY OF THE INVENTION

Accordingly, it is an object of the present invention to overcome the foregoing problems and provide a display panel which can stabilize the supply of color material particles as well as reduce the waste amount of used color material particles, thereby suppressing deformation or damages of the outer walls of cell regions, and a method of manufacturing such display panel.

To achieve the above mentioned object, according to one aspect of the invention, there is provided a method of manufacturing a display panel with a substrate having an electrode at each of a plurality of cell regions partitioned by partition walls provided upright, the method supplying color material particles with an electrostatic property to each of the cell regions based on a supply pattern of the color material particles which is preformed on an electrophotographic transfer body, the method comprising the steps of: providing an interval holding section between a non-display area of a surface of the substrate and a non-transfer area of a surface of the transfer body, the interval holding section having a first height dimension for holding an interval between the non-display area and the non-transfer area at a predetermined value at a time when the transfer body transfers the color material particles to the substrate; and transferring the color material particles to the substrate from the transfer body while biasing at least one of the substrate and the transfer body toward the other thereof in such a way that the interval holding section holds the interval between the non-transfer area of the transfer body and the non-display area of the substrate at the predetermined value.

According to another aspect of the invention, there is provided a method of manufacturing a display panel with a substrate having an electrode at each of a plurality of cell regions partitioned by partition walls provided upright, the method supplying color material particles with an electrostatic property to each of the cell regions based on a supply pattern of the color material particles which is preformed on an electrophotographic transfer body, the method comprising the steps of providing an interval holding section between an off-substrate area on a transfer member and a non-transfer area of a surface of the transfer body, the interval holding section having a fourth height dimension for holding an interval between the off-substrate area on the transfer member and the non-transfer area at a predetermined value at a time when the transfer body transfers the color material particles to the substrate, and transferring the color material particles to the substrate from the transfer body while biasing at least one of the transfer member and the transfer body toward the other thereof in such a way that the interval holding section holds the interval between the non-transfer area of the transfer body and the off-substrate area on the transfer member at the predetermined value.

DETAILED DESCRIPTION OF THE PREFERRED EMBODIMENTS

General Description

Figure 1:
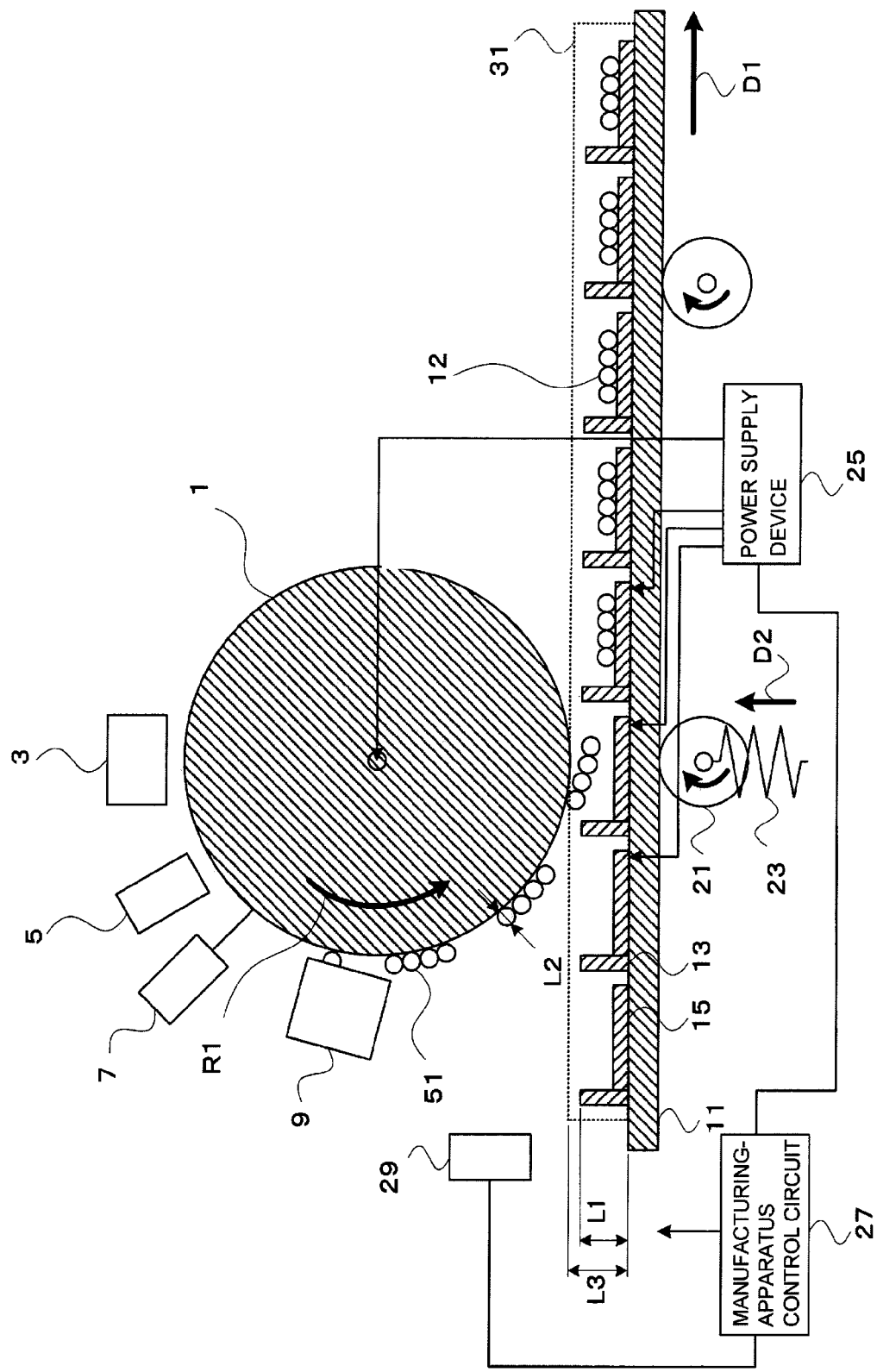
FIG. 1 is a block diagram showing the schematic configuration of the essential portion of an apparatus for manufacturing a particle movement type display panel according to a first embodiment of the present invention.

To overcome the above mentioned problems, one embodiment of a manufacturing method for a display panel according to claim 1 of the invention is a method of manufacturing a display panel with a substrate having an electrode at each of a plurality of cell regions partitioned by partition walls provided upright, the method supplying color material particles with an electrostatic property to each of the cell regions based on a supply pattern of the color material particles which is preformed on an electrophotographic transfer body, the method comprising the steps of: providing an interval holding section between a non-display area of a surface of the substrate and a non-transfer area of a surface of the transfer body, the interval holding section having a first height dimension for holding an interval between the non-display area and the non-transfer area at a predetermined value at a time when the transfer body transfers the color material particles to the substrate; and transferring the color material particles to the substrate from the transfer body while biasing at least one of the substrate and the transfer body toward the other thereof in such a way that the interval holding section holds the interval between the non-transfer area of the transfer body and the non-display area of the substrate at the predetermined value. According to the embodiment, the interval can be stabilized by providing the interval holding section between the substrate and the transfer body, and biasing one of the substrate and the transfer body toward the other to stably supply color material particles into the individual cell regions.

The embodiment may be modified preferably as set forth in claim 2 in such a way that in the step of providing the interval holding section, the first height dimension is set larger than a sum of a second height dimension of the partition walls and a value of a particle size of the color material particles. The first height dimension of the interval holding section is set larger than the sum of the second height dimension of the partition walls and the value of the particle size of the color material particles, so that in transferring color material particles into each cell, it is possible to suppress the color material particles contacting the partition walls of the cell regions and falling off the cell, and deformation or damaging of the outer walls of the cell regions.

The embodiment may be modified preferably as set forth in claim 3 in such a way that in the step of providing the interval holding section, a substrate-side interval holding section which contacts the non-transfer area of the transfer body when the transfer body transfers the color material particles to the substrate is provided at the non-display area of the substrate, and in the step of transferring the color material particles, the color material particles are transferred to the substrate from the transfer body while rendering the substrate-side interval holding section in contact with the non-transfer area of the transfer body. The provision of the substrate-side interval holding section at the non-display area of the substrate can allow the height of the interval holding section to be adjusted according to the height of the cell partition wall of each substrate and the particle size of the color material even in a case where the size of the cell regions and the diameter of the color material particles change a lot as in the case of, for example, a large item small volume production.

The embodiment may be modified preferably as set forth in claim 4 in such a way that in the step of providing the substrate-side interval holding section, the substrate-side interval holding section is provided along a traveling direction of the substrate. As the substrate-side interval holding section is provided along the traveling direction of the substrate, color material particles can be supplied to individual lines of cells (individual lines of cells aligned in a direction orthogonal to the traveling direction of the substrate) in the same manner.

The embodiment may be modified preferably as set forth in claim 5 in such a way that in the step of providing the substrate-side interval holding section, the substrate-side interval holding section is provided successively at the non-display area of the substrate along the traveling direction in a predetermined pattern. As the substrate-side interval holding section is provided successively in a predetermined pattern along the traveling direction of the substrate, electric power to generate an electric field for transfer can be reduced because, for example, optimal distance between the substrate and the transfer body can be set for each cell line.

The embodiment may be modified preferably as set forth in claim 6 in such a way that in the step of providing the substrate-side interval holding section, the substrate-side interval holding section is provided intermittently at the non-display area on the side face side of each of the cell regions which lies in a direction orthogonal to the traveling direction, at an interval equal to or larger than at least a pitch of the cell regions. An extra material for the interval holding section can be reduced by intermittently providing the substrate-side interval holding section in the traveling direction of the substrate.

The embodiment may be modified preferably as set forth in claim 7 in such a way as to further comprise a step of providing a plurality of projections to be fitted in respective intervals of the substrate-side interval holding sections provided intermittently, at the non-transfer area of the transfer body. The provision of the projections to be fitted in respective intervals of the intermittent substrate-side interval holding sections at the non-transfer area of the transfer body can improve the precision of alignment of the substrate with the transfer body.

The embodiment may be modified preferably as set forth in claim 8 in such a way that in the step of providing the interval holding section, a transfer-body-side interval holding section which contacts the non-display area of the substrate when the transfer body transfers the color material particles to the substrate is provided at the non-transfer area of the transfer body, and in the step of transferring the color material particles, the color material particles are transferred to the substrate from the transfer body while rendering the transfer-body-side interval holding section in contact with the non-display area of the substrate. The provision of the transfer-body-side interval holding section at the non-transfer area of the transfer body can allow the height of the interval holding section to be adjusted according to the height of the representative cell partition wall of the substrate and the particle size of the color material to uniform the intervals between the individual substrates and the transfer body at the time of producing all the substrates in the case of mass production of substrates without a change in the diameter of the color material particles and with the same cell sizes in the manufacturing step. Further, as it is unnecessary to provide the interval holding section or the like at all the substrates as in the case of providing the interval holding section at the substrate, the manufacturing cost of the display panel can be reduced.

The embodiment may be modified preferably as set forth in claim 9 in such a way that in the step of providing the transfer-body-side interval holding section, the transfer-body-side interval holding section is provided along a traveling direction of the transfer body. As the transfer-body-side interval holding section is provided along the traveling direction of the transfer body, color material particles can be supplied to individual lines of cells (individual lines of cells aligned in a direction orthogonal to the traveling direction of the substrate) in the same manner, and supply amount of the color material particles can be stabilized.

The embodiment may be modified preferably as set forth in claim 10 in such a way that in the step of providing the transfer-body-side interval holding section, the transfer-body-side interval holding section is provided successively at the non-transfer area of the transfer body in a predetermined pattern. As the transfer-body-side interval holding section is provided successively in a predetermined pattern along the traveling direction of the transfer body, the optimal distance between the substrate and the transfer body, for example, can be set in common to transfer of each cell line, thereby reducing electric power to generate a electrical field for transfer.

The embodiment may be modified preferably as set forth in claim 11 in such a way that in the step of providing the transfer-body-side interval holding section, the transfer-body-side interval holding section is provided intermittently at the non-transfer area at an interval equal to or larger than at least a pitch of the cell regions, and in the step of transferring the color material particles, the transfer-body-side interval holding sections provided intermittently are set in contact with the non-display area on a side face of each of the cell regions and in a direction orthogonal to the traveling direction. An extra material for the interval holding section can be reduced by intermittently providing the transfer-body-side interval holding section in the traveling direction of the transfer body.

The embodiment may be modified preferably as set forth in claim 12 in such a way as to further comprise a step of providing a plurality of projections to be fitted in respective intervals of the transfer-body-side interval holding sections provided intermittently, at the non-display area of the substrate. Misalignment of the substrate with the transfer body may occur due to an aging oriented change (change in frictional force), wear-out with usage, mixture of a foreign materials or the like. According to the embodiment, as the substrate and the transfer body are both moving, such misalignment can be absorbed by intermittently providing the projections to be fitted in the intermittent transfer-body-side interval holding sections at the non-display area of the substrate. As the projections to be fitted to the transfer-body-side interval holding sections are provided on the surface of the substrate, it can improve the precision of alignment of the substrate with the transfer body.

To overcome the above mentioned problems, another embodiment of a manufacturing method for a display panel according to claim 13 of the invention is a method of manufacturing a display panel with a substrate having an electrode at each of a plurality of cell regions partitioned by partition walls provided upright, the method supplying color material particles with an electrostatic property to each of the cell regions based on a supply pattern of the color material particles which is preformed on an electrophotographic transfer body, the method comprising the steps of: providing an interval holding section between an off-substrate area on a transfer member and a non-transfer area of a surface of the transfer body, the interval holding section having a fourth height dimension for holding an interval between the off-substrate area on the transfer member and the non-transfer area at a predetermined value at a time when the transfer body transfers the color material particles to the substrate; and transferring the color material particles to the substrate from the transfer body while biasing at least one of the transfer member and the transfer body toward the other thereof in such a way that the interval holding section holds the interval between the non-transfer area of the transfer body and the off-substrate area on the transfer member at the predetermined value. According to the embodiment, the interval can be stabilized by providing the interval holding section between the transfer member of the substrate and the transfer body, and biasing one of the substrate and the transfer body toward the other to stably supply color material particles into the individual cell regions. In addition, it is unnecessary to provide space for the interval holding section at both side portions of the substrate in the transfer direction, thus making it possible to reduce the material cost and the cut-out cost after usage or the like, and reduce the number of manufacturing processes.

The embodiment may be modified preferably as set forth in claim 14 in such a way that the color material particles with the electrostatic property have plural types of colors, different transfer bodies for different color types of the color material particles are disposed along the traveling direction of the substrate, the supply pattern is formed on a different transfer body for each of the color types in association with cell regions of the each color type on the substrate of the display panel, and the color material particles of each color type are supplied to the cell regions of the respective color type based on the supply pattern. According to the embodiment, in the case of providing cell lines to which individual color material particles corresponding to the three primary colors for color display are sequentially supplied in the traveling direction on the substrate, for example, it is possible to supply color material particles of each color type corresponding to the cell regions of the respective color type for each color.

The embodiment may be modified preferably as set forth in claim 15 in such a way that the color material particles of at least two different colors are filled in the cell regions of the respective color types on the substrate. According to the embodiment, it is possible to supply color material particles of individual color types, such as white and red, white and blue, and white and green.

Effect of the Invention

According to the invention, the interval can be stabilized by providing the interval holding section between the substrate for a display panel and the transfer body at the time of manufacturing the display panel, and biasing one of the substrate and the transfer body toward the other to stably supply color material particles into the individual cell regions, so that color material particles can be supplied uniformly and stably for each substrate and each cell line. This makes it possible to increase the amount of color material particles to be supplied to each cell and enhance the resolution. According to the invention, the height dimension of the interval holding section is set larger than the sum of the height dimension of the partition walls and the value of the particle size of the color material particles, so that in transferring color material particles into each cell, it is possible to suppress the color material particles contacting the partition walls of the cell regions and falling off the cell, and deformation or damaging of the outer walls of the cell regions. This can reduce the waste amount of color material particles, thus reducing the manufacturing cost.

DESCRIPTION OF ILLUSTRATED EMBODIMENTS

An embodiment of a manufacturing apparatus according to the invention will be described below in detail referring to the accompanying drawings.

First Embodiment (Manufacturing Apparatus)

Figure 2:
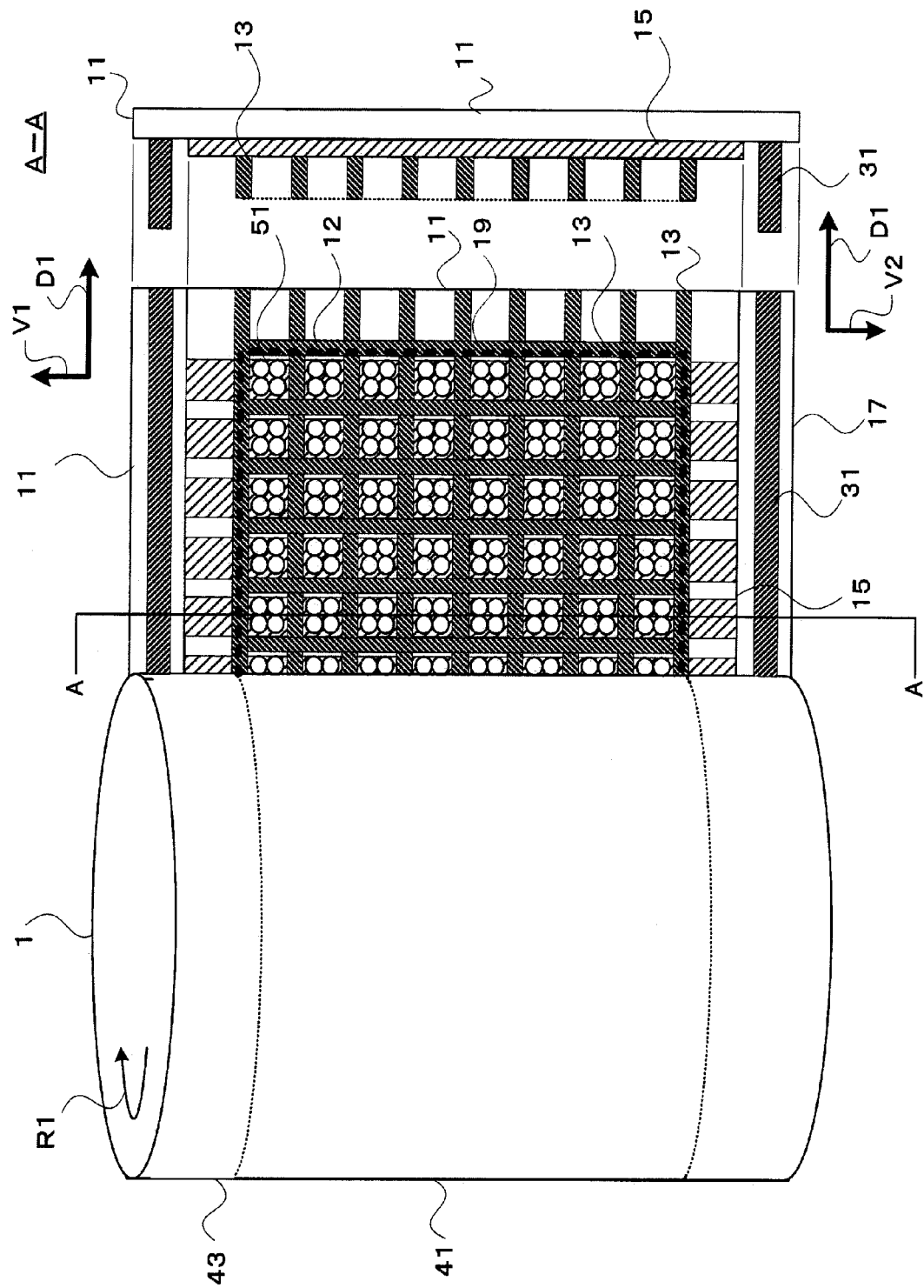
FIG. 2 presents a plan view of a transfer body and a substrate in FIG. 1 as seen from the top, and a cross-sectional view of the substrate along the line A-A.
Figure 3:
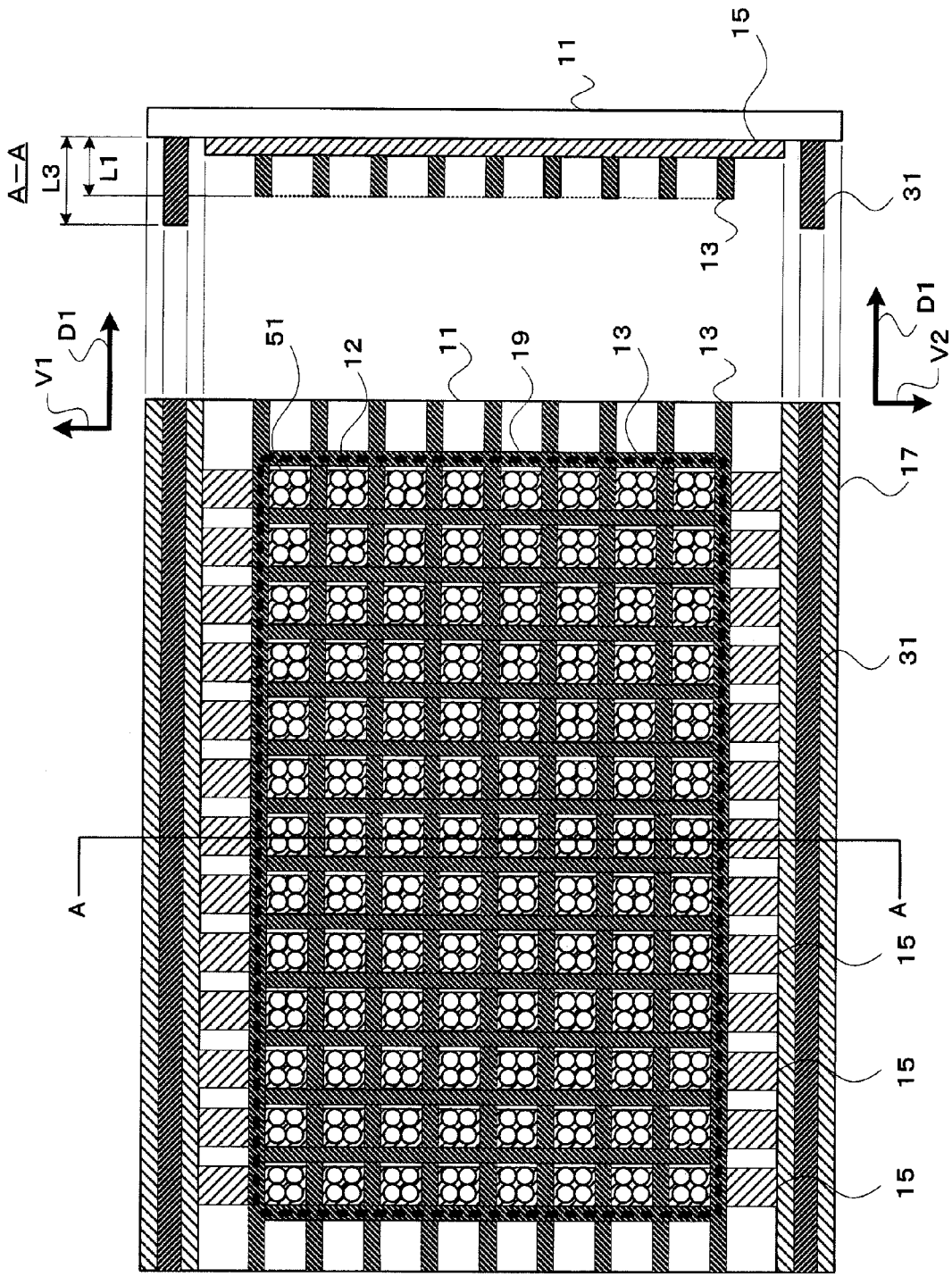
FIG. 3 presents a top view and front view showing the entire substrate in FIG. 1.

FIG. 1 is a block diagram showing the schematic configuration of the essential portion of an apparatus for manufacturing a particle movement type display panel according to the first embodiment of the invention. FIG. 2 presents a plan view of the transfer body and the substrate in FIG. 1 as seen from the top, and a cross-sectional view of the substrate along the line A-A. FIG. 3 presents a top view and front view showing the entire substrate in FIG. 1.

A first transfer body 1 in FIG. 1 carries charged particles 51. According to the embodiment, the charged particles 51 are attracted onto electrodes 15 by controlling the voltage to be applied to each electrode 15 and the timing for the voltage application. The transfer body 1 is disposed at a position facing the side of the substrate 11 where the electrodes 15 are formed. The transfer body 1 has a structure similar to that of an electrophotographic photosensitive drum incorporated in an image forming apparatus, such as a laser printer or LED (Light Emitting Diode) printer, and has a photosensitive layer formed on the outer surface of the drum-shaped casing. The transfer body 1 is not limited to a drum shape, and may be, for example, an endless belt-shaped transfer body.

With the transfer body being a photosensitive body, for example, a supply pattern is easily changed or corrected by writing the supply pattern with a laser beam or the like even in case of changing the transfer position on the substrate for each production or in the case of correcting the transfer position on the substrate 11 every time. Further, the supply pattern can be formed easily by using a laser beam with a small cross-sectional diameter, even in the case of forming a fine supply pattern of 600 ppi or with the center portions of the electrodes having a pitch of 42 µm or so.

While the description of the embodiment will be given of the case where, as mentioned above, the transfer body is a photosensitive body, a drum type electrode having a fixed pattern of electrodes formed on the surface thereof may be used in place of the photosensitive body in a case where the transfer position on the substrate is always the same in every production. In the drum type electrode, an electrode for holding charged particles 51a or 51b is formed at a predetermined position on the surface of the rotary drum connected to a power supply device 25. The diameter of the drum is determined, for example, in such a way that a predetermined position of the drum abuts on or faces the position of each electrode on the substrate as the drum rotates according to the length of the substrate in the transfer direction and the transfer interval of the individual substrates.

In the case of the image forming apparatus, an electrostatic latent image of an image pattern or a character pattern to be transferred is formed on the surface, and the electrostatic latent image is developed with a toner to be a toner image, then the toner image is transferred to a print sheet or the like and fixed, thereby printing the image on the sheet. According to the manufacturing apparatus of the invention, however, color material particles 51 with an electrostatic property are used instead of the toner, an electrostatic latent image corresponding to the pattern of cell regions 12 of the display panel is formed instead of the image pattern, and the electrostatic latent image is developed into a particle image by colored charged particles 51 and carried instead of the toner.

The transfer body 1 rotates in a direction R1 which is forward to a traveling direction D1 in which the substrate 11 is transferred. As a voltage to attract the charged particles 51 from the transfer body 1 is applied to the electrode 15 near the closest position to the surface of the transfer body 1a, the charged particles 51 are attracted onto the electrode 15 and transferred thereto.

A cleaner unit 3 cleans color material particles 51 remaining on the surface of the transfer body 1. A charging unit 5 charges the surface of the transfer body 1. An electrostatic latent image writing unit 7 writes the supply pattern of the color material particles 51 on the surface of the transfer body 1 in association with individual cell regions 12 on the substrate of the display panel by a laser beam or an LED light, thus forming an electrostatic latent image. A developing unit 9 supplies the color material particles 51 to the electrostatic latent image to be written on the surface of the transfer body 1, thus developing the particle image of the color material particles 51 on the surface of the transfer body 1.

The substrate 11 is, for example, a rear-side substrate of the particle movement type display panel, and cell regions 12 equivalent to display pixels are formed on the surface of the substrate. The traveling direction D1 of the substrate 11 is forward to the rotational direction R1 of the drum-like transfer body 1. The substrate 11 is supplied with the color material particles 51 from the transfer body 1 while moving in the direction D1. The cell regions 12 are regions formed on the substrate 11 of the particle movement type display panel with units of display pixels with one pixel as one cell, and the color material particles 51 are supplied into each cell region 12. According to the display system, for example, a liquid medium is colored with a different color from that of the color material particles 51, and the color material particles 51 are moved back and forth between the surface side and the rear surface side to provide each pixel with a color difference to display an image or the like. Alternatively, the liquid medium may not be colored, and for example, two kinds of color material particles 51 with different electric polarities and different colors may be supplied into each cell region 12 in a hyaline vapor medium, and one of the two kinds of color material particles 51 may be moved to the surface side to provide each pixel with a color difference to display an image or the like.

A partition wall 13 forms the boundary to separate the individual cell regions 12. The color material particles 51 in each cell region 12 are enclosed in one cell region 12 by the partition wall 13, and do not move to other cell regions 12. In case of using a medium like a display liquid in the display panel, the partition wall 13 has a function of sealing the medium between the transparent electrode on the surface side and the substrate on the rear surface side. To keep the distance between the surface-side transparent electrode and the rear-side substrate, the material for the partition wall 13 has enough strength not to reduce the interval, however, a material having elasticity for the sealing purpose may be used as well. When the material has elasticity, the partition wall 13 is not damaged even when the color material particles 51 contact the partition wall 13. The height dimension (second height dimension) L1 of the partition wall 13 is the interval between the surface-side transparent electrode and the rear-side substrate of the display panel, which is kept constant by the partition wall 13.

The substrate 11 has a plurality of linear electrodes 15 formed on its surface as a line over the entire area in the widthwise direction (direction orthogonal to the traveling direction D1) of the substrate 11. The electrodes 15 are formed on the surface of the substrate 11 with the direction orthogonal to the traveling direction D1 being the lengthwise direction. The electrode 15 is provided for each line of cell regions 12 aligned in the direction orthogonal to the traveling direction D1. In the display panel 80, the electrodes 15 serve as rear-side electrodes which are individually wire-connected and driven in a passive matrix (PM) system.

In case of manufacturing a display panel which is driven in an active matrix (AM) system, after the charged particles 51 are disposed using the electrodes 15a, substrate having a common electrode formed by wire-connecting all the line electrodes 15 may be used as the front-side substrate. In this case, an active matrix (AM) type TFT panel having a plurality of pixel electrodes corresponding to the respective cell regions 12 should be adhered to the rear-side substrate facing the front-side substrate to form the display panel. It is to be noted however that the pixel electrodes on the rear-side substrate and the cell regions 12 on the front-side substrate are not limited to one-to-one correspondence. For example, a plurality of pixel electrodes may be provided in association with a single cell region 12.

A non-display area 17 of the substrate 11 is the entire area excluding a display area 19 in the substrate 11 in FIG. 3. In the embodiment, a substrate-side interval holding section 31 is provided using the non-display area 17 in directions V1 and V2 orthogonal to the traveling direction D1 of the substrate 11. The display area 19 of the substrate 11 is the area of the display panel which displays an image, and the color material particles 51 are supplied to the individual cell regions 12 in this area. The color material particles 51 supplied to outside of the display area 19 will be wasted.

Feed rollers 21 are disposed on the rear side of the substrate 11 and serve to move the substrate 11 in the traveling direction D1. In the embodiment, the substrate 11 is biased toward the transfer body 1 by the biasing force of a biasing spring 23 to be described later. The biasing spring 23 has one end attached to the shaft portion of the feed roller 21, and the other end fixed to, for example, the casing of the manufacturing apparatus. Accordingly, the biasing spring 23 can bias the feed roller 21 toward the transfer body 1. The direction of the biasing force is shown as a biasing direction D2. The power supply device 25 supplies power to each electrode 15 at the transfer position. The applied voltage has the opposite polarity to the polarity charged on the color material particles 51. The power supply device 25 may apply the polarity opposite to the polarity charged on the color material particles 51 to the line of electrodes closest to the transfer body 1, and may apply the same polarity as the polarity charged on the color material particles 51 to the line of electrodes of cells before transfer. The power supply device 25 supplies power to the entire manufacturing apparatus including, for example, the cleaner unit 3, the charging unit 5, the electrostatic latent image writing unit 7, the developing unit 9 or the like, as well as the electrodes 15.

A manufacturing-apparatus control circuit 27 includes, for example, a microprocessor, a memory circuit and an input/output interface or the like, and it is connected to at least a sensor 29 and the power supply device 25 to execute the general control of the manufacturing apparatus including a sequence of processes of charging the transfer body 1, writing an electrostatic latent image thereon and developing the electrostatic latent image, detection of the substrate 11, control of the moving speed of the substrate 11 and the rotational speed of the transfer body 1, voltage supply to the individual sections from the power supply device 25 and transfer of the color material particles 51 to the substrate 11 from the transfer body 1. The sensor 29 detects the substrate 11 which has moved in the manufacturing apparatus, and outputs the detection result to the manufacturing-apparatus control circuit 27. Accordingly, the manufacturing-apparatus control circuit 27 detects the position of the substrate 11, writes an electrostatic latent image onto the transfer body 1 to adheres the color material particles 51 thereto, and transfers the color material particles 51 to adequate cell regions 12 on the substrate 11.

The substrate-side interval holding section 31 is a member to hold the distance between the substrate 11 and the transfer body 1 provided at the non-display area 17 in the directions V1 and V2 orthogonal to the traveling direction D1 of the substrate 11. The substrate-side interval holding section 31 may be obtained by adhering another member to the surface of the substrate 11, or by means similar to the partition wall 13. The height dimension (first height dimension) L3 of the substrate-side interval holding section 31 is set larger than the sum of the height dimension L1 of the partition wall 13 and the particle size value L2 of the color material particles 51. As the particle size value L2 of the color material particles 51, the value of the particle size d (0.9) or a particle size value larger than the particle size d if possible are used to reduce the probability that the color material particles 51 will contact the partition walls 13 of the cell regions 12.

A transfer area 41 of the transfer body 1 is an area where the color material particles 51 held on the outer surface of the transfer body 1 are transferred to the cell regions 12 on the substrate 11. A non-transfer area 43 of the transfer body 1 is an area other than the transfer area 41 on the outer surface of the transfer body 1.

The color material particles 51 are colored particles with an electrostatic property which have a color material mixed in a resin. For example, an acrylic resin can be used, titanium oxide or the like can be used for the color material for white, and carbon black or the like can be used for the color material for black. The particle size value L2 of the color material particles 51 is the value of the particle size d (0.9) or the value larger than the value of the particle size d if possible. If this value is set too large to cope with all particles, however, power needed for transfer increases, so that a value close to the value of the particle size d (0.9) or the like is used.

With regard to materials which provide charge polarities, for example, a quanternary ammonium base, nigrosine-base dye or the like provides a positive polarity, and metal-contained salicylate complex, chlor-contained organic dye or the like provides a negative polarity. Those materials are not restrictive. The amount of charges of the charged particles can be controlled by a finishing agent, such as silica particles, for performing an additive treatment on the particle surface. Of course, the amount of charges may be controlled by combining those materials. The particles or coloring materials may be, for example, dyes or pigments used for three primary colors (CMY: Cyan, Magenta, Yellow) or the like of the subtractive color mixture for color display, besides the aforementioned white and black.

(Display Apparatus)

Figure 4:
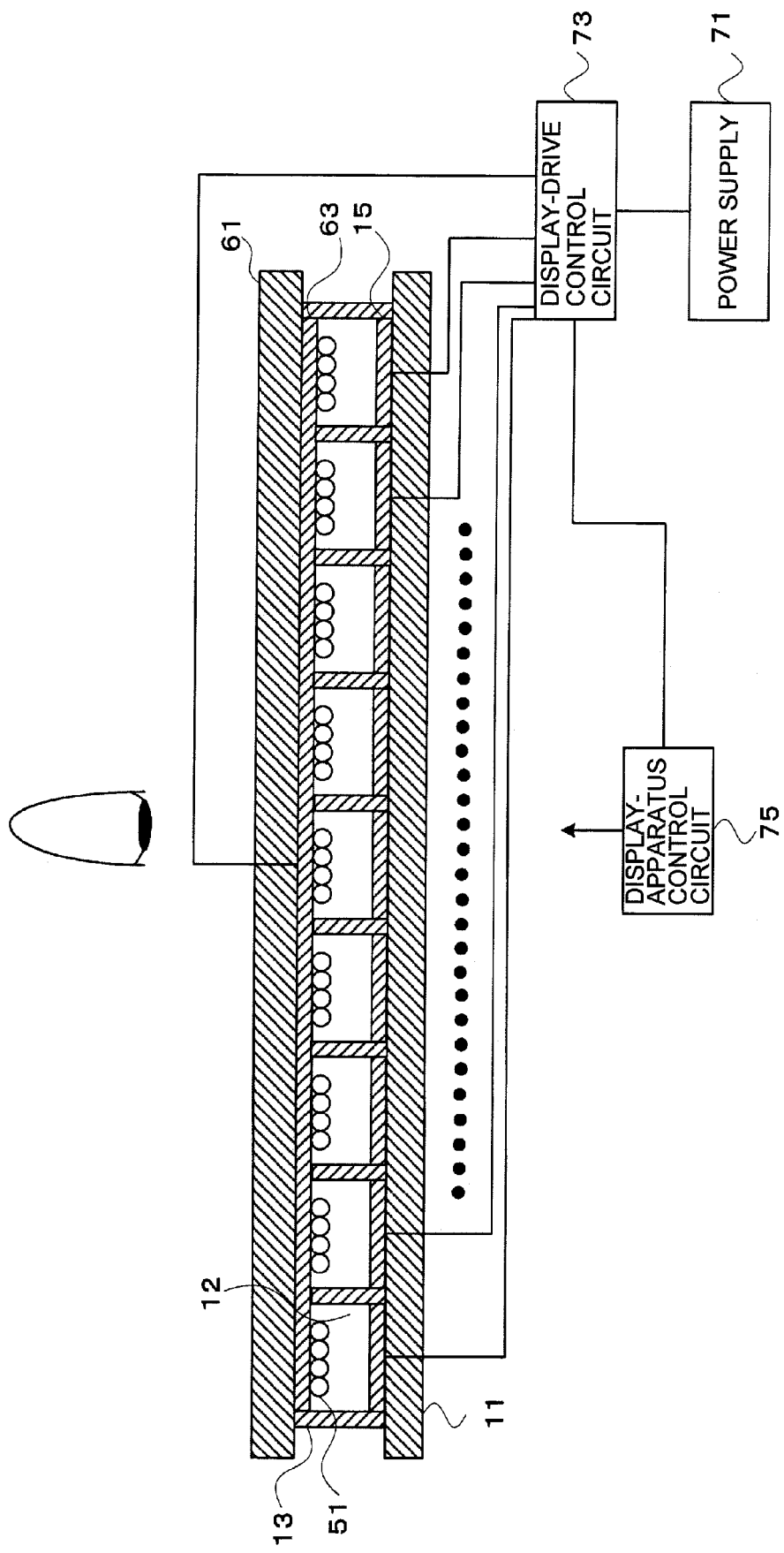
FIG. 4 is a block diagram showing the schematic configuration of the essential portion of a display apparatus using the particle movement type display panel according to the first embodiment of the invention.

FIG. 4 is a block diagram showing the schematic configuration of the essential portion of a display apparatus using the particle movement type display panel according to the first embodiment of the invention.

Referring now to FIG. 4, the display panel having the substrate 11 supplied with the charged particles 51 by the foregoing manufacturing apparatus, and a display apparatus equipped with the display panel will be described. The display panel has the substrate 11 supplied with the charged particles 51 by the foregoing manufacturing apparatus, and a transparent substrate 61 disposed opposite to the substrate 11. The transparent substrate 61 has a plurality of linear transparent electrodes 63 formed thereon and aligned with a direction orthogonal to the electrodes 15 being the lengthwise direction. The electrode 15 and the transparent electrodes 63 are formed in such a way that the transparent electrodes 63 face the electrodes 15 at the positions of the cell regions 12 in the orthogonal relation as viewing the display panel from the transparent substrate 61. For example, color material particles 51 of a first color (e.g., white) which have one of the charge polarities and a solvent colored to a second color (e.g., black) are supplied to each cell region 12 of the substrate 11. Color material particles of the second color having the opposite polarity may be used in the particle movement type display panel instead of coloring the solvent. The display panel displays images by applying a voltage to those electrodes in the passive matrix system by the display-drive control circuit 73.

The transparent substrate 61 is adhered to the top sides of the partition walls 13 in a way to close the top sides of the cell regions 12. At the time of closing the top sides of the cell regions 12, for example, an ultraviolet-curing adhesive may be applied to the tops of the individual partition walls 13, and the transparent substrate 61 may be positioned and placed over the top sides of the cell regions 12, then adhered by illumination of ultraviolet rays.

In case of using the display panel for a display apparatus, the electrodes 15 on the substrate 11 and the transparent electrodes 63 on the transparent substrate 61 are connected to the display-drive control circuit 73 by electric wires or the like. The display-drive control circuit 73 is supplied with power from a power supply 71 to change the positive and negative polarities of the voltage to be supplied cell region by cell region. The power supply 71 may be of a type which is connected to a commercially available power supply and converts the commercially available supply voltage before usage, or a type which converts the battery voltage before usage. Accordingly, applying different voltages to each electrode 15 and each transparent electrode 63 can generate an electric field between both electrodes.

When the transparent substrate 61 side is in the positive side of the electric field, the rear-side substrate 11 side is in the negative side of the electric field, and the charged particles 51b is a material to be charged positive, the black color of the colored solvent is shown on the surfaces of the transparent electrodes 63 of the transparent substrate 61, and the white charged particles 51b are adhered to the surfaces of electrodes 15a and 15b of the rear-side substrate 11. If the voltage to be supplied to each electrode is applied in such a way that the direction of the electric field is reversed, the white charged particles 51b are adhered to the surfaces of the transparent electrodes 63 of the transparent substrate 61, then the whole cell regions 12 are shown white.

Various images and characters using the cell regions 12 as display dots of each image can be displayed by controlling the voltages to be applied to the cell regions 12 by the display-drive control circuit 73. A display-apparatus control circuit 75 includes, for example, a microprocessor, a memory circuit, an input/output interface or the like. The display-apparatus control circuit 75 is connected to at least the display-drive control circuit 73 and input/output means (not shown), and it reads contents to be input by a user through the input/output means from the memory circuit or the like and displays the read contents on the display panel 80.

Figure 5:
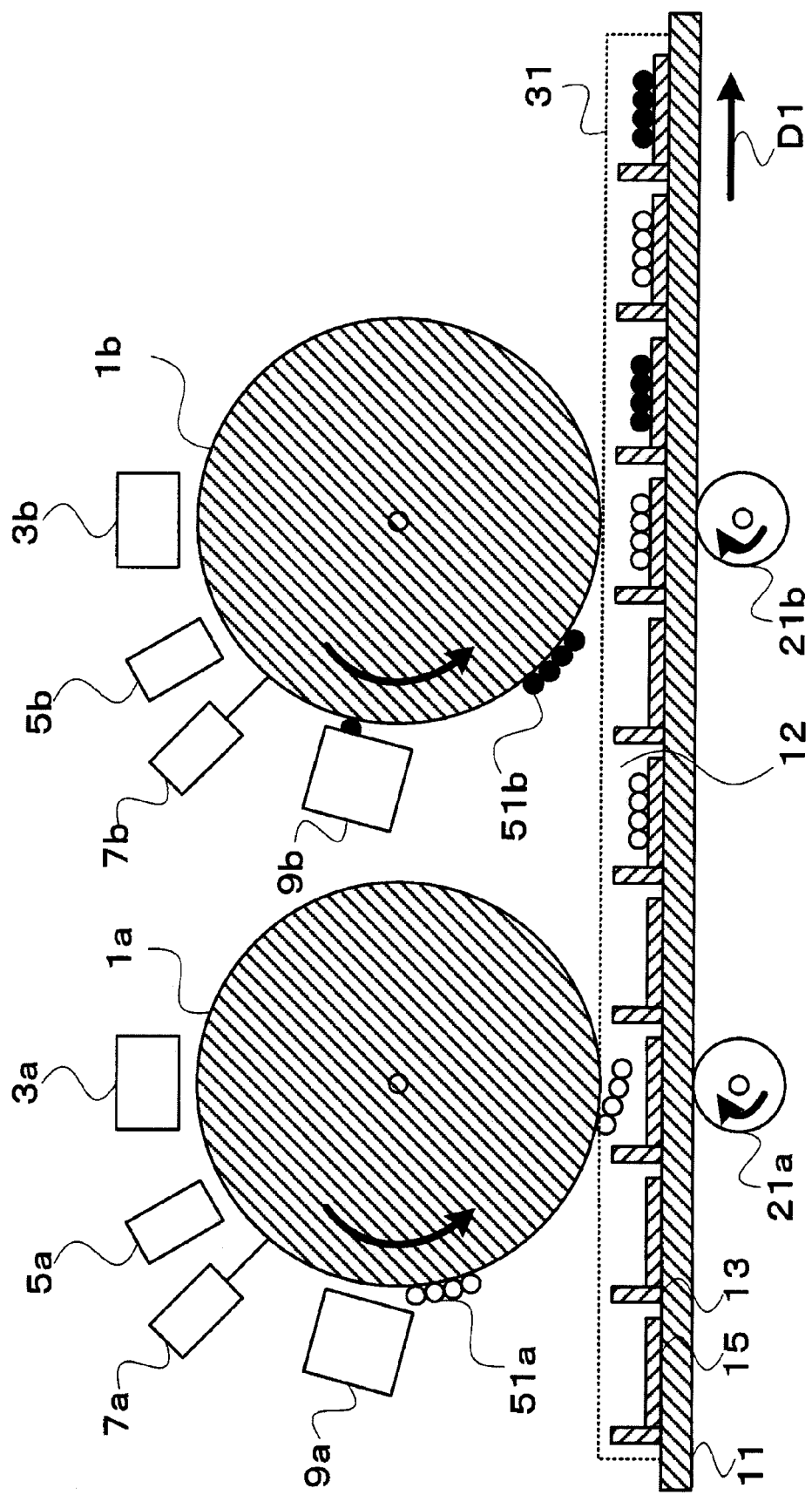
FIG. 5 is a block diagram showing the schematic configuration of the essential portion of an apparatus for manufacturing a particle movement type display panel when color material particles 51a of a first color and color material particles 51b of a second color are supplied to individual cell regions 12 of the substrate 11.

FIG. 5 is a block diagram showing the schematic configuration of the essential portion of an apparatus for manufacturing a particle movement type display panel when the color material particles 51a of the first color and the color material particles 51b of the second color are supplied to the individual cell regions 12 of the substrate 11.

In achieving color display on the display panel, color material particles of the three primary colors like RGB (Red, Green, Blue) or CMY (Cyan, Magenta, Yellow) are supplied to the individual cell regions 12. Schemes for achieving color display include a scheme of making the rear-side substrate 11 and the electrodes 15 transparent and piling three-primary color display panels, and a scheme of supplying three primary colors in order to each line of the cell regions 12 on a single substrate 11. FIG. 5 shows an example of the apparatus which alternately supplies the color material particles 51 of two colors to every other line of cell regions. In case of the color material particles 51 of three colors, the sets of the transfer bodies 1 or the like should be increased to three sets, and each color should be supplied to every two lines of cell regions. The solvent is to be colored black or gray or the like, for example, as needed.

The configuration shown in FIG. 5 will be briefly described below. The transfer body 1a for the first color is an electrophotographic photosensitive drum having a photosensitive layer formed on the outer surface of the drum-like casing. A cleaner unit 3a cleans color material particles 51a for the first color remaining on the surface of the transfer body 1a. A charging unit 5a charges the surface of the transfer body 1a. An electrostatic latent image writing unit 7a writes the supply pattern for supplying the color material particles 51a for the first color to the individual cell regions 12 on the surface of the transfer body 1a, thus forming an electrostatic latent image. A developing unit 9a supplies the color material particles 51a for the first color to the electrostatic latent image formed on the surface of the transfer body 1a to develop the particle image of the color material particles 51a. The color material particles 51a of the particle image on the surface of the transfer body 1a are attracted into the cell regions 12 by the electric field, generated at the transfer position by the electrodes 15, then supplied onto the electrodes 15.

In the same way, the transfer body 1b for the second color is an electrophotographic photosensitive drum having a photosensitive layer formed on the outer surface of the drum-like casing. A cleaner unit 3b cleans color material particles 51b for the second color remaining on the surface of the transfer body 1b. A charging unit 5a charges the surface of the transfer body 1b. An electrostatic latent image writing unit 7b writes the supply pattern for supplying the color material particles 51b for the second color to the individual cell regions 12 on the surface of the transfer body 1b, thus forming an electrostatic latent image. A developing unit 9b supplies the color material particles 51b for the second color to the electrostatic latent image formed on the surface of the transfer body 1b to develop the particle image of the color material particles 51b. The color material particles 51b of the particle image on the surface of the transfer body 1b are attracted into the cell regions 12 by the electric field, generated at the transfer position by the electrodes 15, then supplied onto the electrodes 15. In this manner, the color material particles 51a, 51b of different colors can be supplied to every other line of cell regions 12.

(Manufacturing Method)

Figure 6:
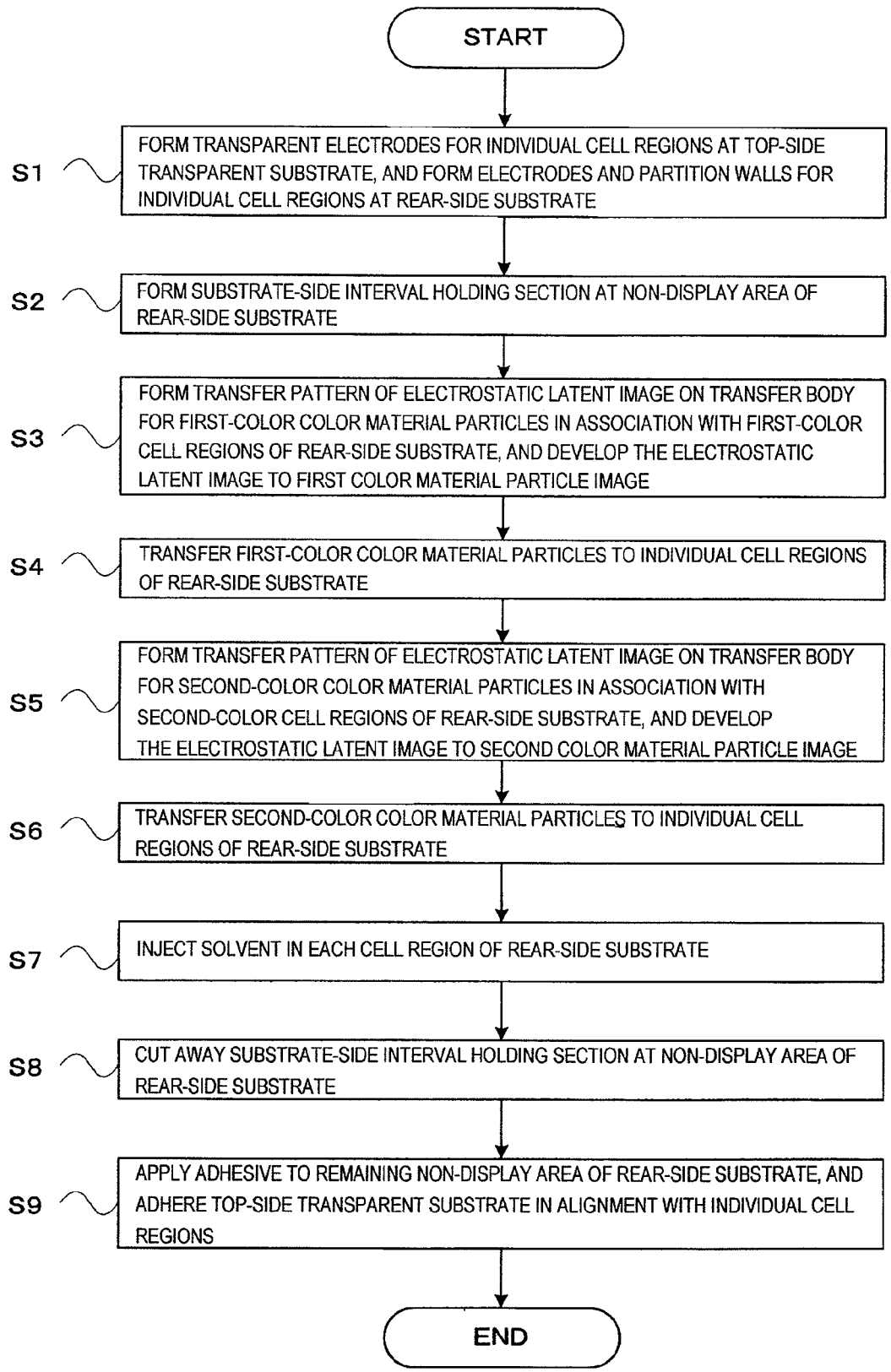
FIG. 6 is a flowchart illustrating a schematic manufacturing method for the particle movement type display panel according to the first embodiment of the invention.

FIG. 6 is a flowchart illustrating a schematic manufacturing method for the particle movement type display panel according to the first embodiment of the invention.

The manufacturing method shown in FIG. 6 will be described below referring to FIGS. 1 to 5. At first, the transparent electrodes 63 for the respective cell regions 12 are formed on the substrate-side transparent substrate 61, and the electrodes 15 and the partition walls 13 for the respective cell regions 12 are formed on the rear-side substrate 11 (S1). In addition, the substrate-side interval holding section 31 is formed at the non-display area 17 of the rear-side substrate 11 (S2). At that time, the interval holding section 31 is successively provided at the non-display area 17 of the substrate 11 between the non-display area 17 of the surface of the substrate 11 and the non-transfer area 43 of the surface of the transfer body 1 in a predetermined pattern along the traveling direction D1 of the substrate 11 in the following ways:

the interval holding section 31 has a first height dimension L3 for holding the interval between the non-display area 17 and the non-transfer area 43 at a predetermined value L3 at the time when the transfer body 1 transfers the color material particles 51 onto the substrate 11, the first height dimension L3 is larger than the sum of the second height dimension L1 of the partition wall 13 and the particle size value L2 of the color material particles 51, and the interval holding section 31 contacts the non-transfer area 43 of the transfer body 1 at the time when the transfer body 1 transfers the color material particles 51 onto the substrate 11.

The predetermined pattern herein should include a pattern of successively providing the substrate-side interval holding section 31 at the same height. The order of the processes of the steps S1 and S2 may be reversed.

Next, the electrostatic latent image writing unit 7a forms the transfer pattern of the electrostatic latent image on the transfer body 1a for the charged particles 51a for the first color in association with the line of the cell regions 12 of the first color of the rear-side substrate 11, and the developing unit 9a develops the electrostatic latent image to form the particle image of the color material particles 51a (S3). When the particle image of the color material particles 51a comes closest to the line of cell regions 12 corresponding to the color material particles 51a on the rear-side substrate 11 as the transfer body 1a rotates, the power supply device 25 applies a voltage of the opposite polarity to the charge polarity of the color material particles 51a to the electrodes 15 of each cell regions 12 of the line. As a result, the charged particles 51a for the first color are transferred to each cell regions 12 of the line corresponding to the color material particles 51a on the rear-side substrate 11 (S4). At this time, the color material particles 51a are transferred to the substrate 11 from the transfer body 1a while biasing the substrate 11 toward the transfer body 1a (direction D2) with the substrate-side interval holding section 31 being in contact with the non-transfer area 43 of the transfer body 1a, so that the substrate-side interval holding section 31 holds the interval between the non-transfer area 43 of the transfer body 1a and the non-display area 17 at the predetermined value L3.

In a case where the color material particles 51 with an electrostatic property has plural types of colors, the transfer body 1 has different transfer bodies 1a, 1b disposed along the traveling direction D1 of the substrate 11 for the respective color types of the color material particles 51a, 51b, supply patterns are formed on the different transfer bodies 1a, 1b in association with the cell regions 12 for the respective color types on the substrate 11 of the display panel, and the color material particles 51a, 51b of the respective color types are supplied to the cell regions 12 for the respective color types based on the supply patterns. Therefore, the supply of the charged particles 51b for the second color is carried out as follows. At the same time as the transfer process for the first color or with a slight delay therefrom, the transfer pattern of an electrostatic latent image is formed on the transfer body 1b for the charged particles 51b for the second color in association with the cell regions 12 for the second color of the rear-side substrate 11, and the electrostatic latent image is developed to yield the particle image of the color material particles 51b by the developing unit 9b (S5).

When the particle image of the color material particles 51b comes closest to the line of cell regions 12 corresponding to the color material particles 51b on the rear-side substrate 11 as the transfer body 1b rotates, the power supply device 25 applies a voltage of the opposite polarity to the charge polarity of the color material particles 51b to the electrodes 15 of each cell regions 12 of the line. As a result, the charged particles 51b for the second color are transferred to each cell regions 12 of the line corresponding to the color material particles 51b on the rear-side substrate 11 (S6). At this time, the color material particles 51b are transferred to the substrate 11 from the transfer body 1b while biasing the substrate 11 toward the transfer body 1b (direction D2) with the substrate-side interval holding section 31 being in contact with the non-transfer area 43 of the transfer body 1b, so that the substrate-side interval holding section 31 holds the interval between the non-transfer area 43 of the transfer body 1b and the non-display area 17 at the predetermined value L3. If there is a third color, the color material particles are transferred in similar procedures taken for the first color and the second color.

A solvent colored black or the like is injected into each cell region 12 of the rear-side substrate 11 (S7). Then, if the substrate-side interval holding section 31 at the non-display area 17 of the rear-side substrate 11 interferes with adhesion of the top-side transparent substrate 61 placed on the top sides of the cell regions 12, the portion of the non-display area 17 where the substrate-side interval holding section 31 is formed is cut away (S8), whereas if the substrate-side interval holding section 31 does not interfere with the adhesion, the portion where the substrate-side interval holding section 31 is formed may be left. Next, an adhesive is applied onto the remaining non-display area of the rear-side substrate 11, and the top-side transparent substrate 61 is adhered thereto in alignment with the cell regions 12 (S9).

As apparent from the above, the embodiment can be adapted at the time of manufacturing a display panel in which the color material particles 51 are supplied for each of the cell regions 12 arranged in a grid pattern. The non-display area of the surface of the substrate 11 is a area where the cell regions 12 on the substrate 11 of the display panel are not provided. For example, multiple cell regions 12 are provided on the rear-side substrate 11 of the display panel in a grid pattern in association with the respective pixels of the display panel, and the peripheral area around the display area 19 which is not used in display cell regions 12 is the non-display area in the case that the cell regions 12 are treated as the display area 19. If the transfer body 1 has a drum shape, for example, the non-transfer area 43 of the surface of the transfer body 1 is both end portions in the axial direction which are not used in transfer on the outer surface of the drum.

The height dimension of the interval holding section is the vertical dimension upward from the surface of the transfer body 1 when the interval holding section is provided on the transfer body 1 side, and it is a vertical dimension upward from the surface of the substrate 11 when the interval holding section is provided on the substrate 11 side. Biasing at least one of the substrate 11 and the transfer body 1 toward the other thereof means that if the transfer body 1 has a drum shape, force is applied to the substrate 11 by an elastic member or the like to normally press the substrate 11 toward the transfer body 1 at the location where the distance between the substrate 11 and the transfer body 1 becomes the shortest, or force is applied to the transfer body 1 by an elastic member or the like to normally press the transfer body 1 toward the substrate 11 at that location. Transfer of the color material particles 51 to the substrate 11 from the transfer body 1 is to, for example, apply a voltage of the opposite polarity to the charge polarity of the color material particles 51 to the electrode in each cell region 12 of the substrate 11, thereby allowing the static color material particles 51 adhered to the electrostatic latent image on the transfer body 1 to be attracted and adhered to the electrode in each cell region 12 of the substrate 11.

The height dimension of the partition wall 13 differs according to the type of the display medium or the like, but may lie within the range of, for example, 1 to 500 μm. The color material particles 51 may have an approximately spherical shape with the particle size value being 0.5 to 10 μm. The particle size value is indicated as the particle size d (0.5), for example, when 50% of the color material particles 51 are smaller than the particle size value and the remaining 50% of the color material particles 51 are larger than the particle size value. When the particle size d (0.5) is larger than the range of 0.1 to 20 μm, for example, display clearness is reduced, whereas when the particle size d (0.5) is smaller than the range, the cohesive force between particles becomes larger, so that the particles become difficult to move in the cell region 12. The distribution of the particle sizes of the color material particles is acquired from particle size span calculated by the following formula:

$$\text{Particle size span} = (d(0.9) - d(0.1))/d(0.5)$$

using the aforementioned particle size d (0.5), the particle size d (0.9) when 90% of the color material particles 51 are smaller than the particle size value and the remaining 10% of the color material particles 51 are larger than the particle size value, the particle size d (0.1) when 10% of the color material particles 51 are smaller than the particle size value and the remaining 90% of the color material particles 51 are larger than the particle size value. Since the individual color material particles 51 can move uniformly in the cell region 12 if their sizes are set equal, it is desirable that the particle size span should be set in a range of 5 or less, or a range of 3 or less.

When a plurality of color material particles 51 are mixed in the same cell region 12, it is preferable to set the particle size values of the color material particles 51 of the individual colors equal so that equal amounts of particles of the individual colors can easily move in the opposite directions in the cell region 12. For example, it is desirable that the ratio of the particle size d (0.5) for the color with the maximum particle size to the particle size d (0.5) for the color with the minimum particle size in the particle sizes of the color material particles 51 for the individual colors should be set equal to or less than 50, preferably equal to or less than 10. Since the distribution of the light intensity pattern with a laser beam irradiated on the color material particles 51, for example, corresponds to the particle size, the distribution of the particle sizes can be measured (laser diffraction/scattering method). In the embodiment, the probability that the color material particles 51 will contact the partition wall 13 of the cell region 12 can be reduced by using the value of the particle size d (0.9), or the value of the particle size d (0.95), d (0.99) or the like as larger than the former particle size d (0.9) as possible, as the particle size value of the color material particles 51 for acquiring the first height dimension of the interval holding section. Therefore, the embodiment can reduce wasting of the color material particles 51 and can stably supply the color material particles 51 to each cell region 12 to enhance the resolution.

The traveling direction of the substrate 11 is the direction where the substrate 11 moves at the time of transferring the color material particles 51 from the transfer body 1 to the substrate 11 having the cell regions 12 formed thereon. The traveling direction of the substrate 11 is the same as the traveling direction R1 at the point of contact of the transfer body 1 with the substrate 11, and matches with the rotational direction at the point of contact of the transfer body drum with the substrate 11 when the transfer body 1 has a drum shape rotating about the axis.

Successive provision in a predetermined pattern includes, for example, a case where the interval holding sections are provided successively at the same height, a case where the interval holding sections are provided successively while changing the height for each line of cells, a case where the interval holding sections are provided successively with high portions and low portions provided for each line of cells, and a case where the successive provision is carried out on condition that it is set whether or not to provide the interval holding section for each line of cells.

When the transfer surface is considered as approximately a flat surface because the diameter of the drum-shaped transfer body 1 is very large with respect to the pitch of the individual lines of cells, for example, the substrate-side interval holding section need not be provided successively for each line of cells, so that the substrate-side interval holding sections may have an inverted comb-like shape, or may be arranged at every other line of cells or every two other lines of cells to have an intermittent comb-like shape. The substrate-side interval holding sections may have a comb-like shape so that the substrate-side interval holding sections are independently provided from the surface of the substrate 11, or the substrate-side interval holding sections may have only the transfer-body side distal end portions arranged intermittently while having the base portions on the substrate 11 side integrally coupled together, for example, when the individual provision would result in insufficient strength.

According to the embodiment, as the substrate 11 and the transfer body 1 are both moving, misalignment of the substrate 11 with the transfer body 1 may occur due to an aging oriented change (change in frictional force), wear-out with usage, mixture of a foreign materials or the like, but the misalignment can be absorbed by intermittently providing, on the transfer body 1 side, the projections to be fitted in the intermittent transfer-body-side interval holding sections at the same pitches as the intermittent substrate-side interval holding sections.

The traveling direction of the transfer body 1 is the direction where the transfer body 1 at the point of contact of the transfer body 1 with the substrate 11 moves at the time of transferring the color material particles 51 from the transfer body 1 to the substrate 11 having the cell regions 12 formed thereon. When the transfer body 1 has a drum shape rotating about the axis, the traveling direction of the transfer body 1 is the rotational direction at the point of contact of the transfer body drum with the substrate 11.

Successive provision in a predetermined pattern includes, for example, a case where the interval holding sections are provided successively at the same height, a case where the interval holding sections are provided successively while changing the height for each line of cells, a case where the interval holding sections are provided successively with high portions and low portions provided for each line of cells, and a case where the successive provision is carried out on condition that it is set whether or not to provide the interval holding section for each line of cells.

When the transfer surface is considered as approximately a flat surface because the diameter of the drum-shaped transfer body 1 is very large with respect to the pitch of the individual lines of cells, for example, the transfer-body-side interval holding section need not be provided successively for each line of cells, so that the transfer-body-side interval holding sections may have an inverted comb-like shape, or may be arranged at every other line of cells or every two other lines of cells to have an intermittent comb-like shape. The transfer-body-side interval holding sections may have a comb-like shape so that the transfer-body-side interval holding sections are independently provided from the surface of the substrate 11, or the transfer-body-side interval holding sections may have only the substrate-side distal end portions arranged intermittently while having the base portions on the transfer body 1 side integrally coupled together, for example, when the individual provision would result in insufficient strength.

According to the embodiment, as the substrate-side interval holding section 31 is provided between the substrate 11 and the transfer body 1, and the substrate 11 is biased toward the transfer body 1 (direction D2), the interval can be stabilized and the color material particles 51 can be stably supplied into each cell, thus making it possible to reduce the waste amount of the color material particles 51 and enhance the resolution. Further, the first height dimension of the interval holding section is set larger than the sum of the second height dimension of the partition walls and the value of the particle size of the color material particles, so that in transferring the color material particles into each cell, it is possible to suppress the color material particles contacting the partition walls of the cell regions and falling off the cell, and deformation or damaging of the outer walls of the cell regions. According to the embodiment, the height of the interval holding section 31 can be adjusted according to the height of the cell partition wall 13 of each substrate 11 and the particle size of the color material even in a case where the size of the cell regions 12 and the diameter of the color material particles 51 change a lot as in the case of, for example, a large item small volume production.

According to the embodiment, as the transfer-body-side interval holding section 31 is provided successively along the traveling direction D1 of the transfer body 1, the color material particles 51 can be supplied uniformly to individual lines of cells (lines of cells aligned in the directions V1, V2 orthogonal to the traveling direction D1 of the substrate 11) to stabilize the supply amount of the color materials. Further, the successive provision of the transfer-body-side interval holding section 31 in a predetermined pattern can allow the optimal distance to be set between the substrate 11 and the transfer body 1 for transfer, thus making it possible to reduce the power needed to generate a transfer electric field. Furthermore, in a case where lines of cells to which the individual color material particles 51 corresponding to the three primary colors of color display are supplied in order are provided on the substrate 11 in the traveling direction D1, for example, the color material particles 51 of the respective color types corresponding to the cell regions 12 of the respective color types can be supplied color by color.

Second Embodiment

Although the foregoing description of the first embodiment has been given of the case where the interval holding section is provided on the substrate side, the interval holding section can also be provided on the transfer body side. The following describes a second embodiment where the interval holding section is provided on the transfer body side. It is to be noted that in order to avoid the redundant description, same reference numerals are given to those components of the second embodiment in the associated diagrams which are the same as the corresponding components of the first embodiment, and only the differences will be explained in the following description.

Figure 7:
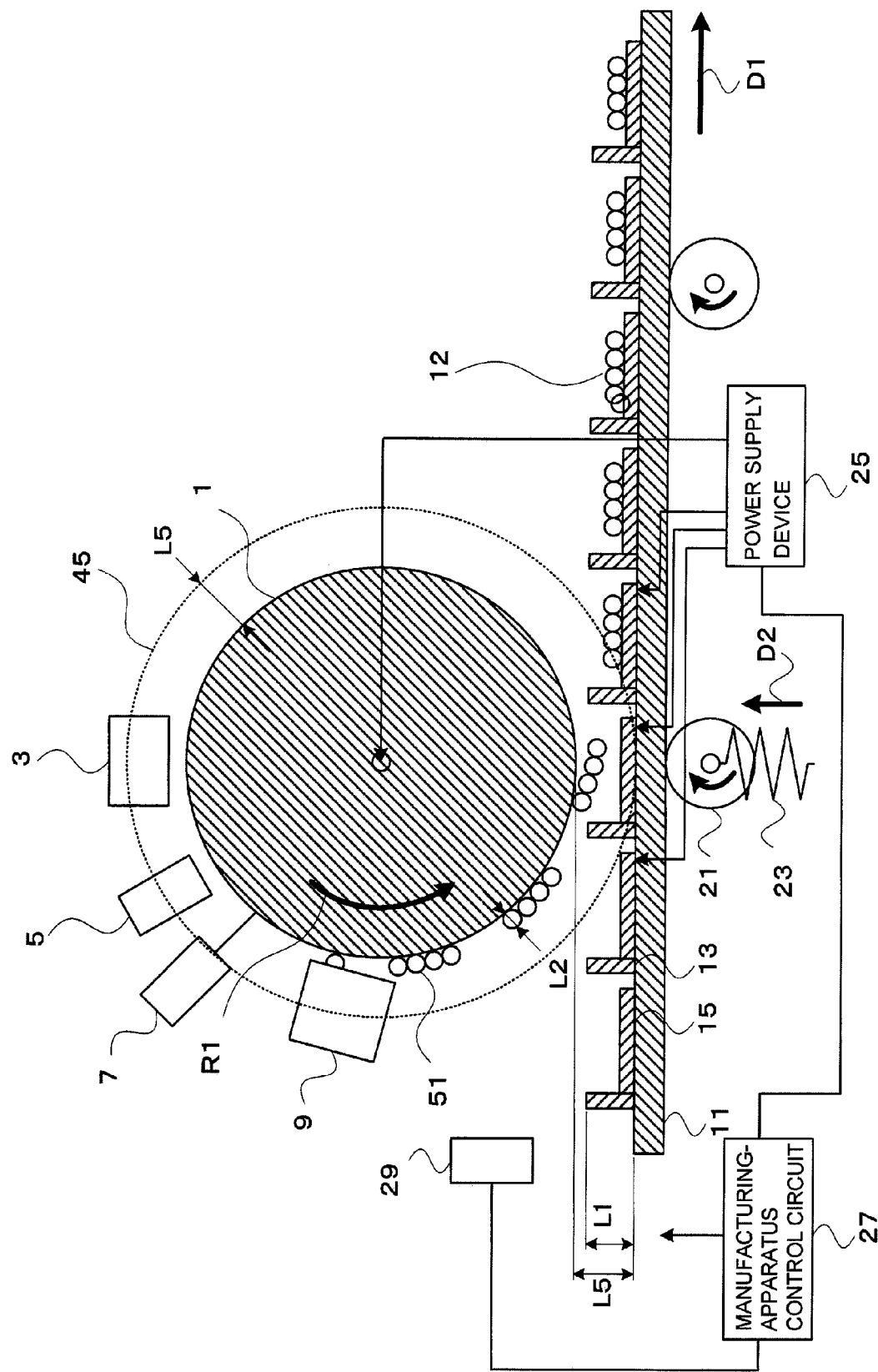
FIG. 7 is a block diagram showing the schematic configuration of the essential portion of an apparatus for manufacturing a particle movement type display panel according to a second embodiment of the invention.
Figure 8:
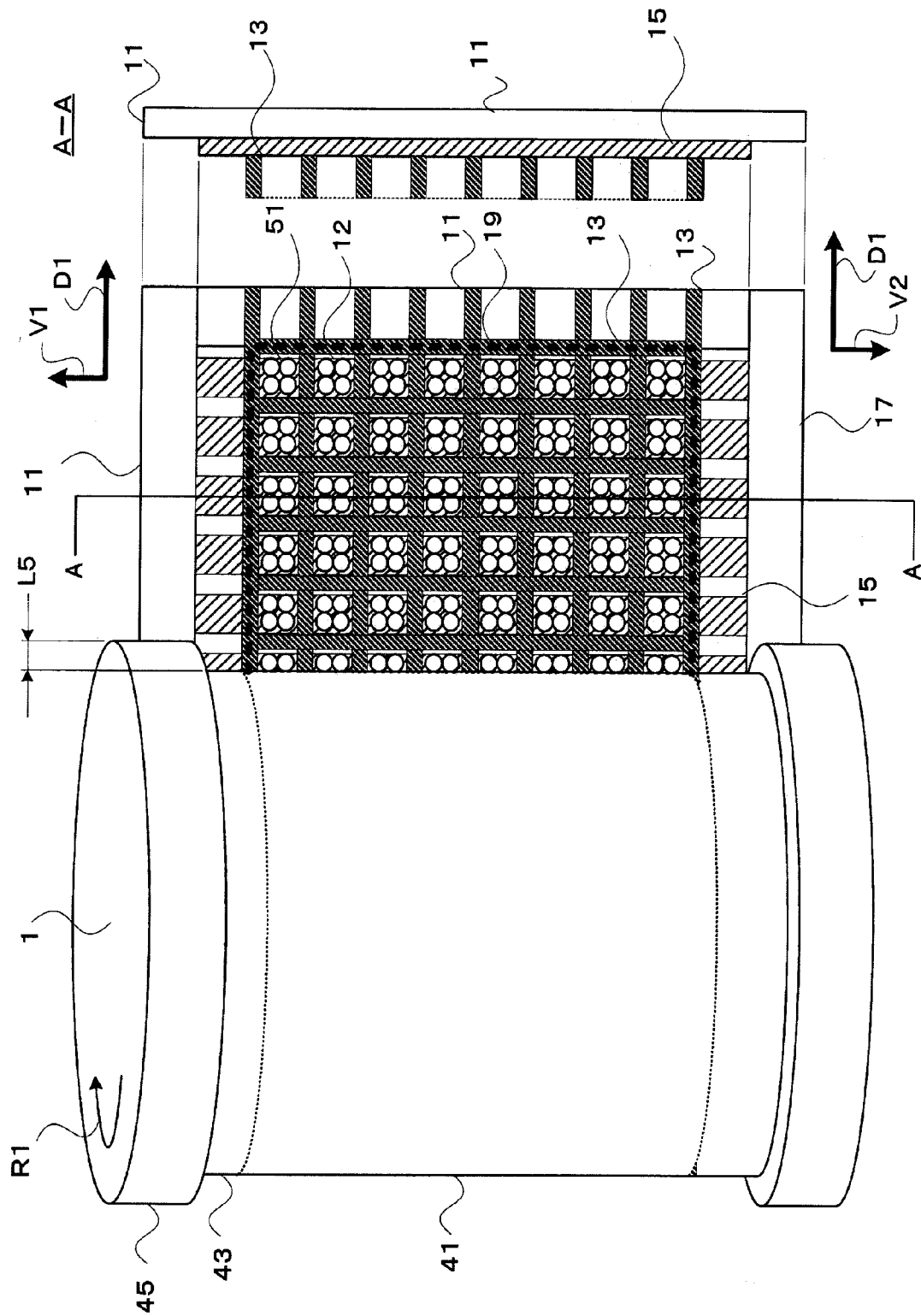
FIG. 8 presents a plan view of a transfer body and a substrate in FIG. 7 as seen from the top, and a cross-sectional view of the substrate along the line A-A.
Figure 9:
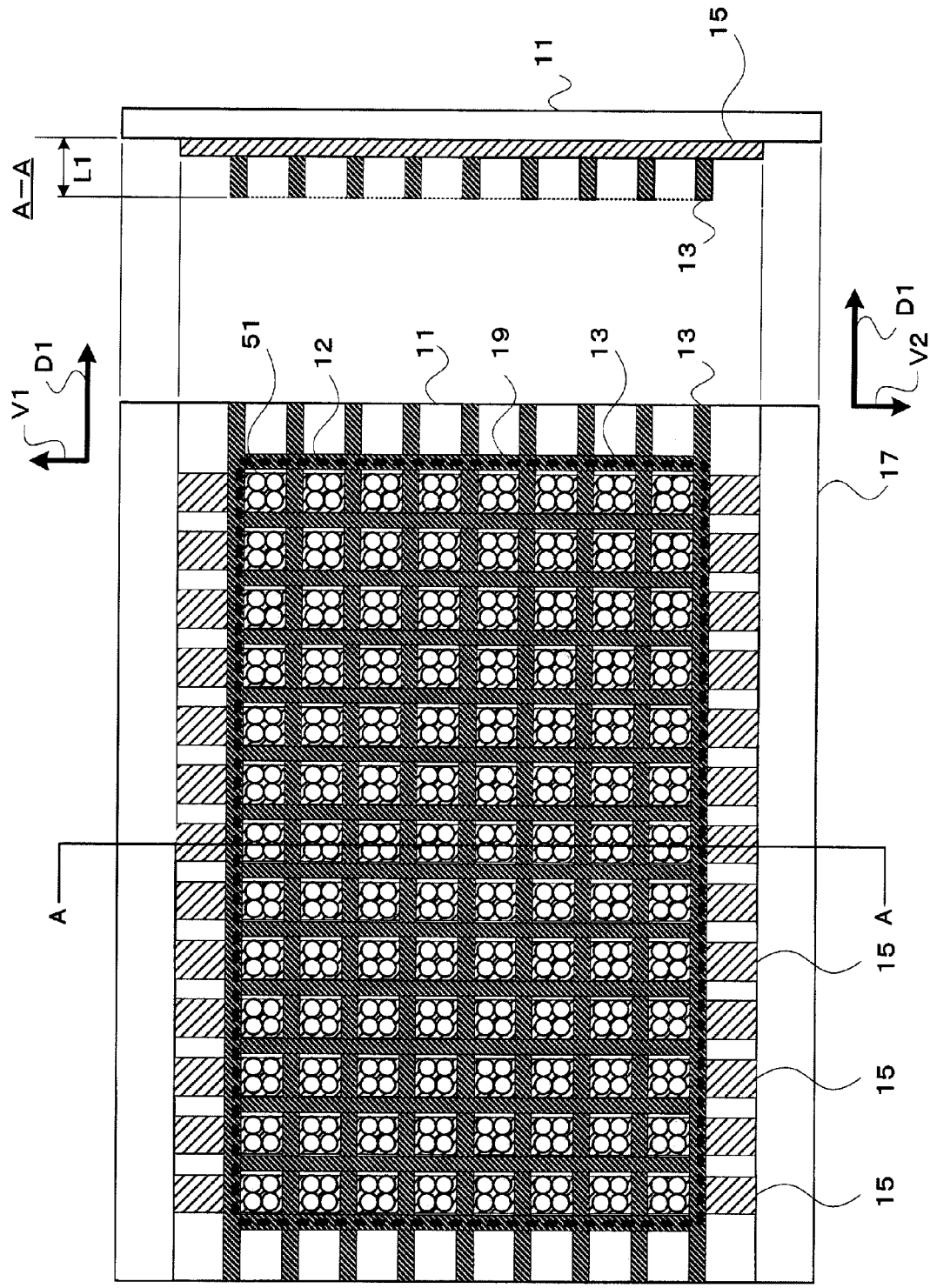
FIG. 9 presents a top view and front view showing the entire substrate in FIG. 7.

FIG. 7 is a block diagram showing the schematic configuration of the essential portion of an apparatus for manufacturing a particle movement type display panel according to the second embodiment of the invention. FIG. 8 presents a plan view of a transfer body and a substrate in FIG. 7 as seen from the top, and a cross-sectional view of the substrate along the line A-A. FIG. 9 presents a top view and front view showing the entire substrate in FIG. 7.

The transfer body 1 according to the embodiment is provided with a transfer-body-side interval holding section 45 which contacts the non-display area 17 of the substrate 11 when the transfer body 1 transfers the color material particles 51 to the substrate 11. The transfer-body-side interval holding section 45 is provided so as to have a first height dimension L5 for holding the interval between the non-transfer area 43 and the non-display area 17 of the substrate 11 at the time of transferring the color material particles 51 from the transfer body 1 to the substrate 11, at a predetermined value L5, and so as to be in contact with the non-display area 17 of the substrate 11. The predetermined value of the interval, like the predetermined value L3 in the first embodiment, should be set equal to or larger than the sum of the height dimension L1 of the partition wall 13 and the particle size value L2 of the color material particles 51, and the value of L5 can be acquired in the same way of the first embodiment. The transfer-body-side interval holding section 45 is provided at the non-transfer area 43 of the transfer body 1 successively in a predetermined pattern along the traveling direction R1 of the transfer body 1. The predetermined pattern also includes a pattern of successively providing the interval holding section at the same height. The other configuration of the transfer body 1 is the same as that of the first embodiment. As the cleaner unit 3, the charging unit 5, the electrostatic latent image writing unit 7, the developing unit 9 and the color material particles 51 are the same as those of the first embodiment, their descriptions will be omitted. The substrate 11 according to the second embodiment does not have the substrate-side interval holding section 31 at the non-display area 17. As the other configuration of the substrate 1.1 is the same as that of the first embodiment, its descriptions will be omitted. Since the feed roller 21, the biasing spring 23 and the power supply device 25 are the same as those of the first embodiment, their descriptions will also be omitted.

(Manufacturing Method)

Figure 10:
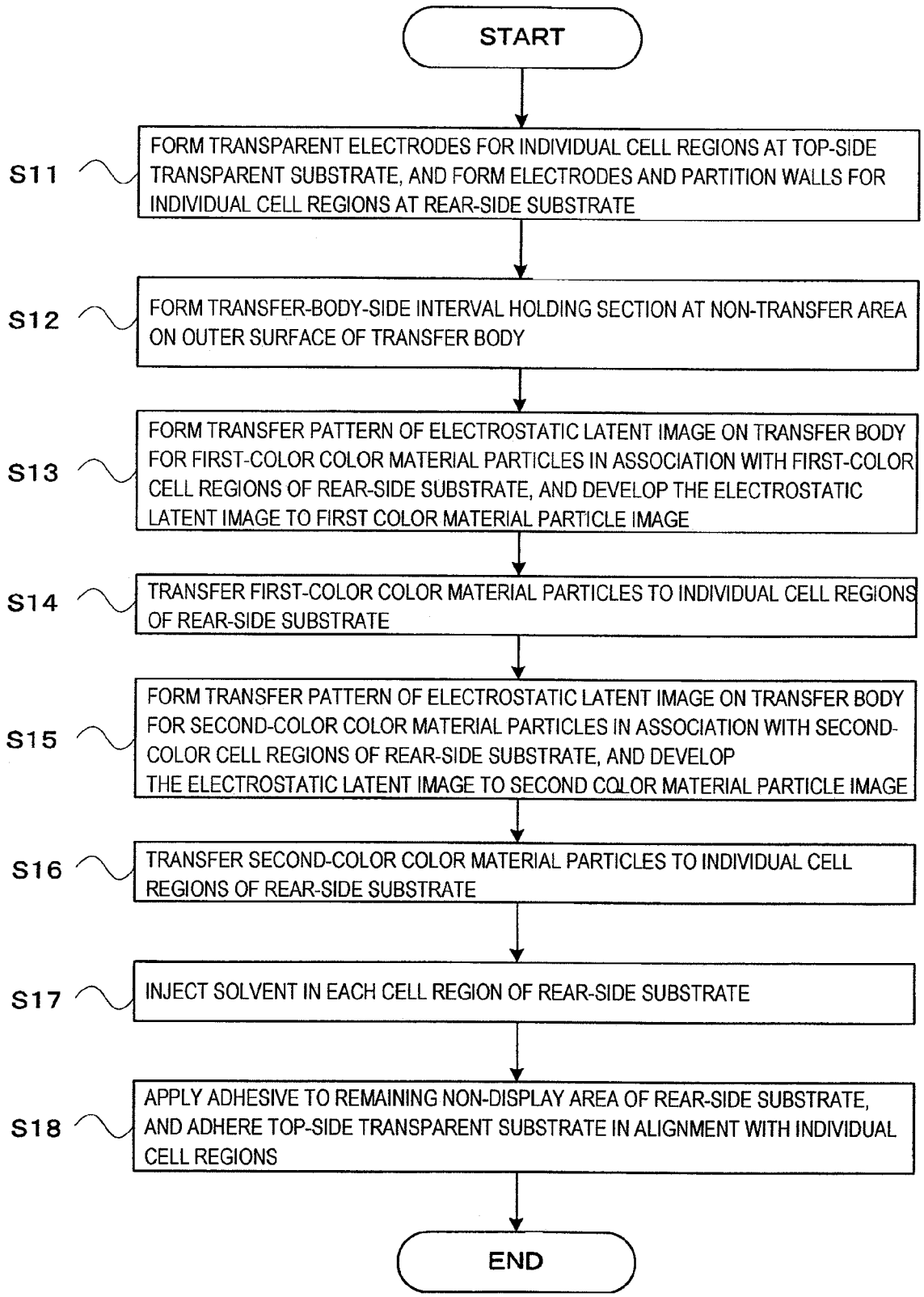
FIG. 10 is a flowchart illustrating a schematic manufacturing method for the particle movement type display panel according to the second embodiment of the invention.

FIG. 10 is a flowchart illustrating a schematic manufacturing method for the particle movement type display panel according to the second embodiment of the invention.

The manufacturing method shown in FIG. 10 will be described below referring to FIGS. 7 to 9, and FIGS. 4 and 5. At first, the transparent electrodes 63 for the respective cell regions 12 are formed on the substrate-side transparent substrate 61, and the electrodes 15 and the partition walls 13 for the respective cell regions 12 are formed on the rear-side substrate 11 (S11). In addition, the transfer-body-side interval holding section 45 is formed at the non-transfer area 43 on the outer surface of the transfer body 1 (S12). At that time, the transfer-body-side interval holding section 45 is successively provided at the non-transfer area 43 of the transfer body 1 between the non-transfer area 43 of the surface of the transfer body 1 and the non-display area 17 of the surface of the substrate 11 in a predetermined pattern along the traveling direction R1 of the transfer body 1 in the following ways:

the transfer-body-side interval holding section 45 has the first height dimension L5 for holding the interval between the non-transfer area 43 and the non-display area 17 at the predetermined value L5 at the time when the transfer body 1 transfers the color material particles 51 onto the substrate 11, the first height dimension L5 is larger than the sum of the second height dimension L1 of the partition wall 13 and the particle size value L2 of the color material particles 51, and the transfer-body-side interval holding section 45 contacts the non-display area 17 of the surface of the substrate 11 at the time when the transfer body 1 transfers the color material particles 51 onto the substrate 11.

The predetermined pattern herein should include a pattern of successively providing the substrate-side interval holding section 31 at the same height. The order of the processes of the steps S11 and S12 may be reversed.

Next, the electrostatic latent image writing unit 7a forms the transfer pattern of the electrostatic latent image on the transfer body 1a for the charged particles 51a for the first color in association with the line of the cell regions 12 of the first color of the rear-side substrate 11, and the developing unit 9a develops the electrostatic latent image to form the particle image of the color material particles 51a (S13). When the particle image of the color material particles 51a comes closest to the line of cell regions 12 corresponding to the color material particles 51a on the rear-side substrate 11 as the transfer body 1a rotates, the power supply device 25 applies a voltage of the opposite polarity to the charge polarity of the color material particles 51a to the electrodes 15 of each cell regions 12 of the line. As a result, the charged particles 51a for the first color are transferred to each cell region 12 of the line corresponding to the color material particles 51a on the rear-side substrate 11 (S14). At this time, the color material particles 51a are transferred to the substrate 11 from the transfer body 1a while allowing the transfer-body-side interval holding section 45 to be in contact with the non-display area 17 of the substrate 11 and biasing the substrate 11 toward the transfer body 1a (direction D2), so that the transfer-body-side interval holding section 45 holds the interval between the non-transfer area 43 of the transfer body 1a and the non-display area 17 at the predetermined value L5.

In a case where the color material particles 51 with an electrostatic property has plural types of colors, the transfer body 1 has different transfer bodies 1a, 1b disposed along the traveling direction D1 of the substrate 11 for the respective color types of the color material particles 51a, 51b, supply patterns are formed on the different transfer bodies 1a, 1b in association with the cell regions 12 for the respective color types on the substrate 11 of the display panel, and the color material particles 51a, 51b of the respective color types are supplied to the cell regions 12 for the respective color types based on the supply patterns. Therefore, the supply of the charged particles 51b for the second color is carried out as follows. At the same time as the transfer process for the first color or with a slight delay therefrom, the transfer pattern of an electrostatic latent image is formed on the transfer body 1b for the charged particles 51b for the second color in association with the cell regions 12 for the second color of the rear-side substrate 11, and the electrostatic latent image is developed to yield the particle image of the color material particles 51b by the developing unit 9b (S15).

When the particle image of the color material particles 51b comes closest to each cell region 12 of the line corresponding to the color material particles 51b on the rear-side substrate 11 as the transfer body 1b rotates, the power supply device 25 applies a voltage of the opposite polarity to the charge polarity of the color material particles 51b to the electrodes 15 of each cell region 12 of the line. As a result, the charged particles 51b for the second color are transferred to each cell region 12 of the line corresponding to the color material particles 51b on the rear-side substrate 11 (S16). At this time, the color material particles 51b are transferred to the substrate 11 from the transfer body 1b while allowing the transfer-body-side interval holding section 45 to be in contact with the non-display area 17 of the substrate 11 and biasing the substrate 11 toward the transfer body 1b (direction D2), so that the transfer-body-side interval holding section 45 holds the interval between the non-transfer area 43 of the transfer body 1b and the non-display area 17 at the predetermined value L5.

If there is a third color, the color material particles are transferred in similar procedures taken for the first color and the second color.

A solvent colored black or the like is injected into each cell region 12 of the rear-side substrate 11 (S17). Next, an adhesive is applied onto the remaining non-display area of the rear-side substrate 11, and the top-side transparent substrate 61 is adhered thereto in alignment with the cell regions 12 (S18).

According to the embodiment, as apparent from the above, the provision of the transfer-body-side interval holding section 45 at the non-transfer area 43 of the transfer body 1 can allow the height of the transfer-body-side interval holding section 45 to be adjusted according to the height of the representative partition wall 13 of the substrate 11 and the size of the color material particles 51 to uniform all the intervals between the individual substrates 11 and the transfer body 1 at the time of manufacturing all the substrates 11 in the case of mass-producing the same substrates 11 without a change in the diameter of the color material particles 51 and with the same cell sizes in the manufacturing step. In addition, the first height dimension of the interval holding section is set larger than the sum of the second height dimension of the partition walls and the value of the particle size of the color material particles, so that in transferring color material particles into each cell, it is possible to suppress the color material particles contacting the partition walls of the cell regions and falling off the cell, and deformation or damaging of the outer walls of the cell regions. Further, unlike in the case of providing the substrate-side interval holding section 31 on the substrate 11, it is not necessary to provide the interval holding section or the like on every substrate 11, thus reducing the cost of the display panel.

According to the embodiment, as the transfer-body-side interval holding section 45 is provided successively along the traveling direction R1 of the transfer body 1, the color material particles 51 can be supplied uniformly to individual lines of cells (lines of cells aligned in the directions V1, V2 orthogonal to the traveling direction D1 of the substrate 11) to stabilize the supply amount of the color materials. Further, according to the embodiment, the successive provision of the transfer-body-side interval holding section 45 in a predetermined pattern along the traveling direction R1 of the transfer body 1 can allow the optimal distance between the substrate 11 and the transfer body 1 to be set in common to the transfer of the individual lines of cells, for example, thus making it possible to reduce the power needed to generate a transfer electric field.

Third Embodiment

Although the foregoing description of the first embodiment has been given of the case where the interval holding section is provided on the substrate side, the interval holding section has only to have a capability of holding the interval at the time of transferring the color material particles 51 to each cell region 12 in consideration of the minimum configuration required, so that the interval holding section can be omitted, excluding both end portions in those lines orthogonal to he traveling direction of the cell regions, thus achieving the intermittent provision of the interval holding sections. In addition, hollow holes to be formed in the interval holding section can be used as a guide for positioning the interval holding section and the transfer body 1 by providing a ladder-like interval holding section at the substrate, e.g., forming projections or the like on the transfer body 1 in association with the ladder intervals. Accordingly, the interval holding section can serve as a positioning guide at the time of transfer while reducing the amount of the material used for the interval holding section. The following describes a third embodiment where the aforementioned ladder-like interval holding section is provided on the substrate side. It is to be noted that in order to avoid the redundant description, same reference numerals are given to those components of the third embodiment in the associated diagrams which are the same as the corresponding components of the first embodiment, and only the differences will be explained in the following description.

Figure 11:
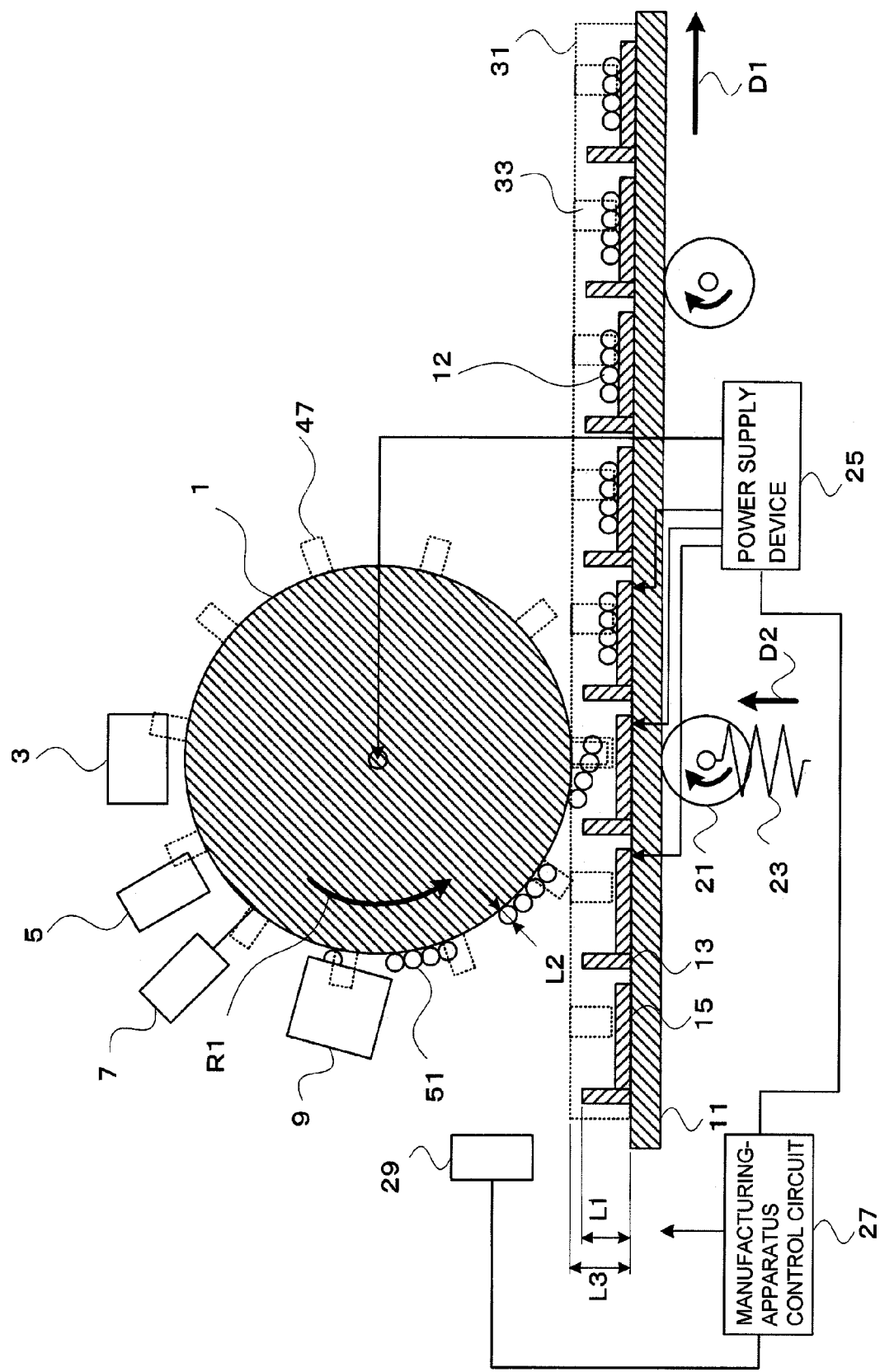
FIG. 11 is a block diagram showing the schematic configuration of the essential portion of an apparatus for manufacturing a particle movement type display panel according to a third embodiment of the invention.
Figure 12:
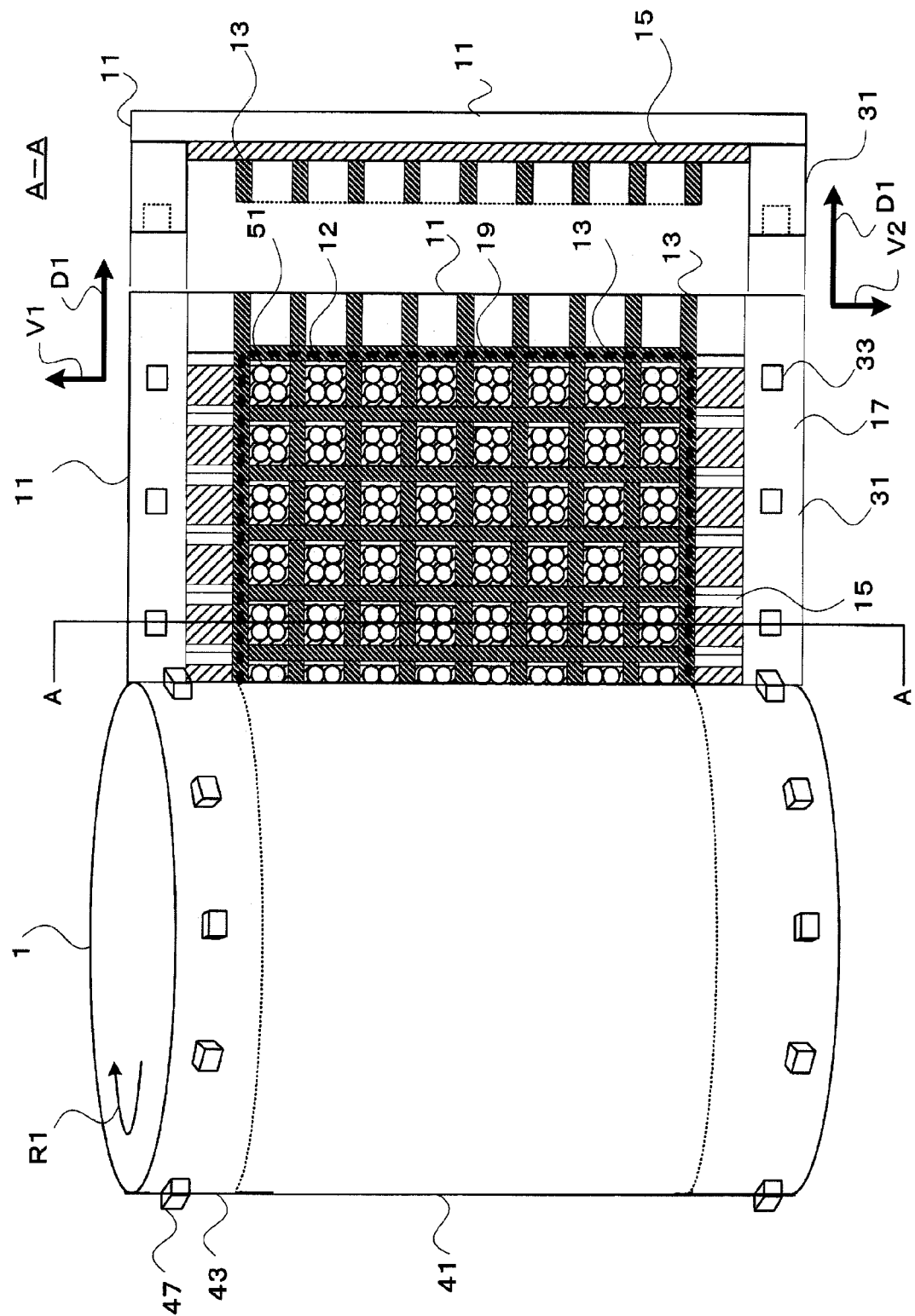
FIG. 12 presents a plan view of a transfer body and a substrate in FIG. 11 as seen from the top, and a cross-sectional view of the substrate along the line A-A.

FIG. 11 is a block diagram showing the schematic configuration of the essential portion of an apparatus for manufacturing a particle movement type display panel according to the third embodiment of the invention. FIG. 12 presents a plan view of a transfer body and a substrate in FIG. 11 as seen from the top, and a cross-sectional view of the substrate along the line A-A.

The substrate 11 according to the embodiment is provided with the substrate-side interval holding section 31 which has intermittent portions intermittently formed at the non-display area 17 in the directions V1, V2 orthogonal to the traveling direction D1 of the cell regions 12 with at least pitches of the cell regions 12 or larger pitches, and link portions formed so as to sandwich the associated intermittent portions. The first height dimension L3 of the substrate-side interval holding section 31 is the same as that of the first embodiment. A predetermined pattern in the embodiment is a ladder-like continuous pattern hollow around the intermittent portions at the pitches of the cell regions 12 or larger pitches. The intermittent portions of the substrate-side interval holding section 31 may have an inverted comb-like shape, or an intermittent comb-like shape having the intermittent portions for every one or every two of the lines of cells. Further, while the substrate-side interval holding section 31 may have such a comb-shape that the intermittent portions are provided independently from the surface of the substrate 11, the substrate-side interval holding section 31 may have only the transfer-body side distal end formed intermittently while having the base portions on the substrate 11 side integrally coupled together. The other configuration of the substrate 11 is the same as that of the first embodiment, and its description will therefore be omitted.

Since the feed roller 21, the biasing spring 23 and the power supply device 25 are the same as those of the first embodiment, their descriptions will also be omitted. As the cleaner unit 3, the charging unit 5, the electrostatic latent image writing unit 7, the developing unit 9 and the color material particles 51 are the same as those of the first embodiment, their descriptions will be omitted. A plurality of projections 47 to be fitted in the respective intervals of the substrate-side interval holding section 31 provided intermittently are provided at the non-transfer area 43 of the transfer body 1 according to the embodiment. In other words, the projections 47 which have the same pitches as the intermittent portions of the substrate-side interval holding section 31 and are to be fitted therein are provided intermittently at the non-transfer area 43 on the transfer body 1 side for positioning the substrate 11 with the transfer body 1.

According to the embodiment, the substrate-side interval holding section 31 is provided intermittently in the traveling direction D1 of the substrate 11, so that the material for the extra substrate-side interval holding section 31 can be reduced. Further, as the projections to be fitted in the intermittent portions of the substrate-side interval holding section 31 are provided at the surface of the transfer body 1 according to the embodiment, the precision of positioning the substrate 11 with the transfer body 1 can be improved.

Fourth Embodiment

Although the foregoing description of the second embodiment has been given of the case where the interval holding section is provided on the transfer body side, the ladder-like interval holding section can be provided at the interval holding section on the transfer body side as has been described in the foregoing description of the third embodiment. In addition, hollow holes to be formed in the interval holding section can be used as a guide for positioning the interval holding section and the substrate 11 by providing a ladder-like interval holding section at the transfer body 1, e.g., forming projections or the like on the substrate 11 in association with the ladder intervals. The following describes a fourth embodiment where the aforementioned ladder-like interval holding section is provided on the transfer body side. It is to be noted that in order to avoid the redundant description, same reference numerals are given to those components of the fourth embodiment in the associated diagrams which are the same as the corresponding components of the second embodiment, and only the differences will be explained in the following description.

Figure 13:
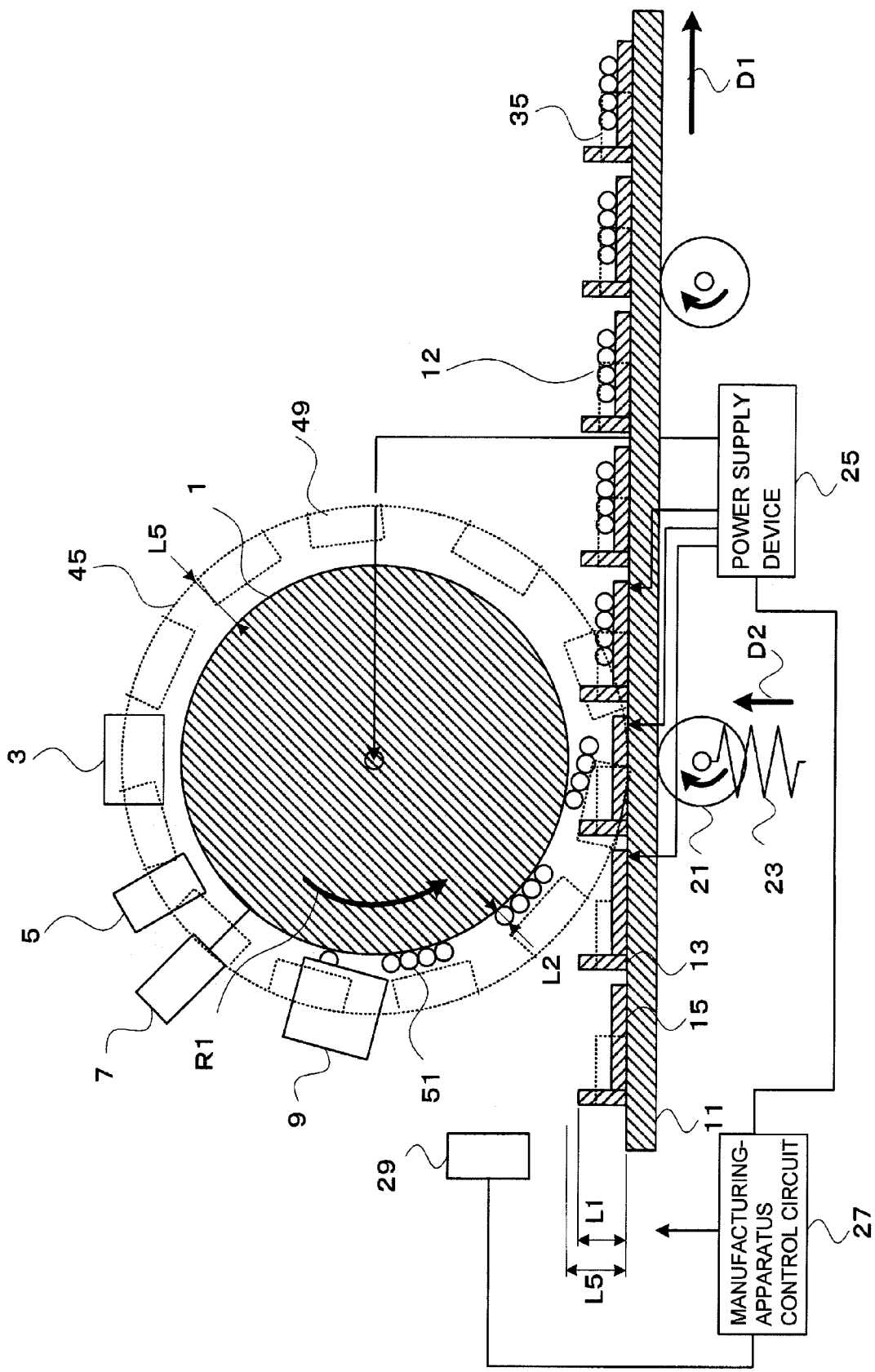
FIG. 13 is a block diagram showing the schematic configuration of the essential portion of an apparatus for manufacturing a particle movement type display panel according to a fourth embodiment of the invention.
Figure 14:
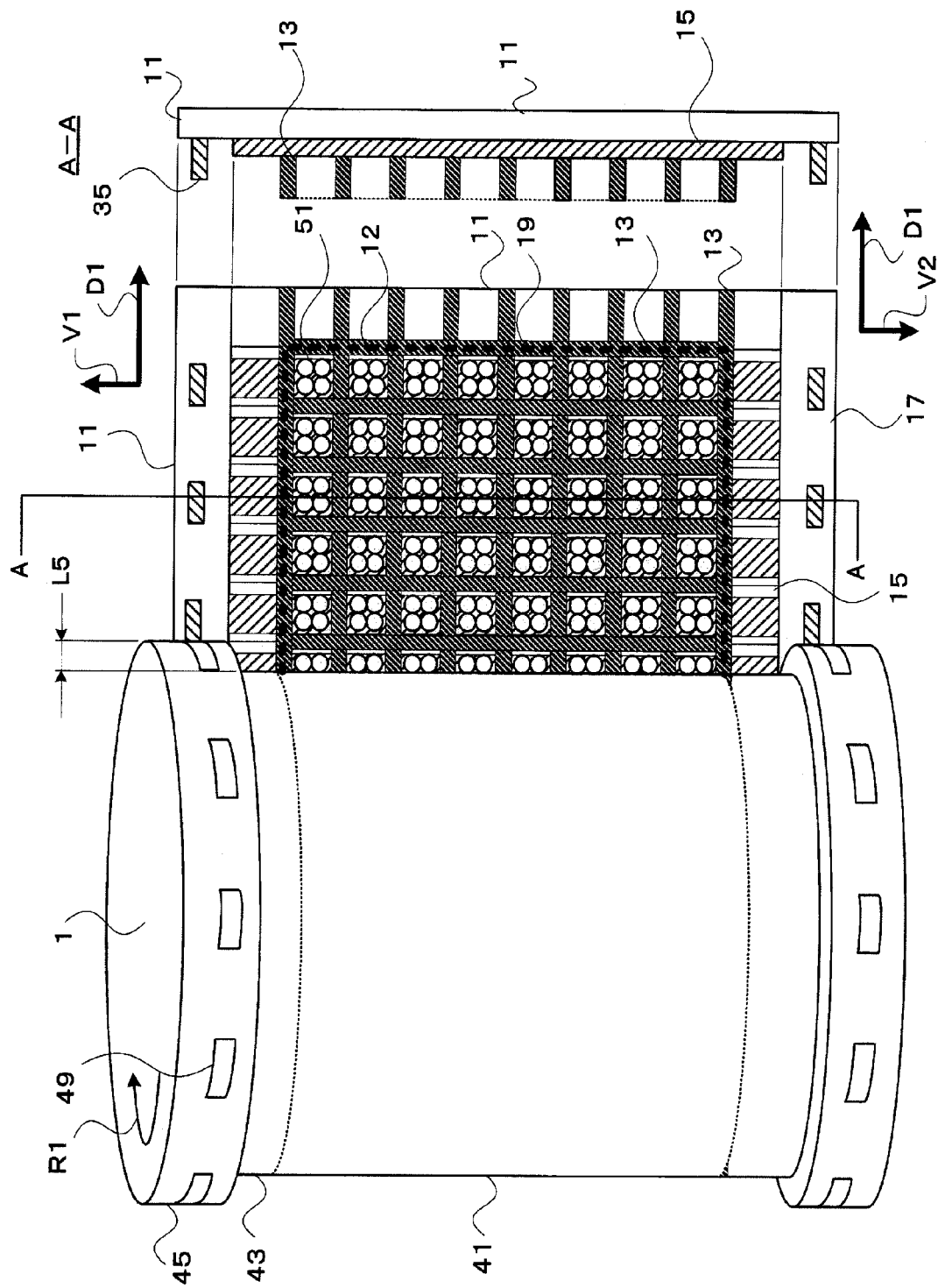
FIG. 14 presents a plan view of a transfer body and a substrate in FIG. 13 as seen from the top, and a cross-sectional view of the substrate along the line A-A.

FIG. 13 is a block diagram showing the schematic configuration of the essential portion of an apparatus for manufacturing a particle movement type display panel according to the fourth embodiment of the invention. FIG. 14 presents a plan view of a transfer body and a substrate in FIG. 13 as seen from the top, and a cross-sectional view of the substrate along the line A-A.

The transfer body 1 according to the embodiment is provided with the transfer-body-side interval holding section 45 which has intermittent portions intermittently formed at the non-transfer area 43 with at least pitches of the cell regions 12 or larger pitches, and link portions formed so as to sandwich the associated intermittent portions. The first height dimension L5 of the transfer-body-side interval holding section 45 is the same as that of the second embodiment. A predetermined pattern in the embodiment is a ladder-like continuous pattern hollow around the intermittent portions at the pitches of the cell regions 12 or larger pitches. The intermittent portions of the transfer-body-side interval holding section 45 may have an inverted comb-like shape, or an intermittent comb-like shape having the intermittent portions for every one or every two of the lines of cells. Further, while the transfer-body-side interval holding section 45 may have such a comb-shape that the intermittent portions are provided independently from the outer surface of the transfer body 1, the transfer-body-side interval holding section 45 may have only the substrate-side distal end formed intermittently while having the base portions on the transfer body 1 side integrally coupled together. Since the other configuration of the transfer body 1 is the same as that of the second embodiment, its description will therefore be omitted.

Since the feed roller 21, the biasing spring 23 and the power supply device 25 are the same as those of the first embodiment, their descriptions will also be omitted. As the cleaner unit 3, the charging unit 5, the electrostatic latent image writing unit 7, the developing unit 9 and the color material particles 51 are the same as those of the second embodiment, their descriptions will be omitted. A plurality of projections 35 to be fitted in the respective intervals of the transfer-body-side interval holding section 45 provided intermittently are provided at the non-display area 17 of the substrate 11 according to the embodiment. In other words, the projections 35 which have the same pitches as the intermittent portions of the transfer-body-side interval holding section 45 and are to be fitted therein are provided intermittently at the non-display area 17 on the substrate 11 side for positioning the transfer body 1 with the substrate 11.

According to the embodiment, the transfer-body-side interval holding section 45 is provided intermittently in the traveling direction R1 of the transfer body 1, so that the material for the extra transfer-body-side interval holding section 45 can be reduced. Further, as the projections to be fitted in the intermittent portions of the transfer-body-side interval holding section 45 are provided at the surface of the substrate 11 according to the embodiment, the precision of positioning the substrate 11 with the transfer body 1 can be improved.

Fifth Embodiment

Although the foregoing description of the first embodiment has been given of the case where the interval holding section is provided on the substrate side, the interval holding section can be provided on the transfer member between the transfer member and the transfer body when the transfer member is used at the time of transferring the substrate. The following describes a fifth embodiment where the interval holding section is provided on the transfer member. It is to be noted that in order to avoid the redundant description, same reference numerals are given to those components of the fifth embodiment in the associated diagrams which are the same as the corresponding components of the first embodiment, and only the differences will be explained in the following description.

Figure 15:
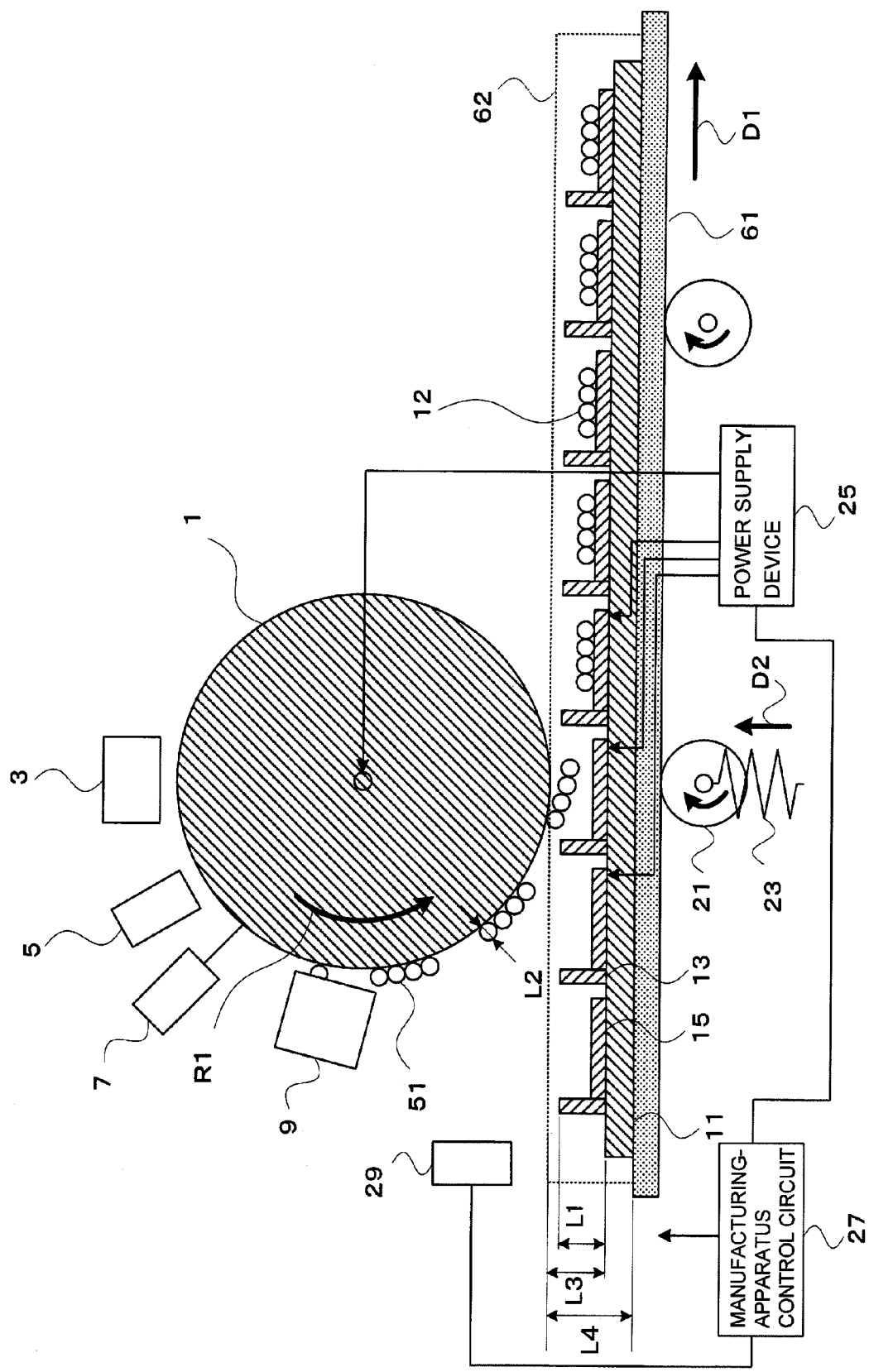
FIG. 15 is a block diagram showing the schematic configuration of the essential portion of an apparatus for manufacturing a particle movement type display panel according to a fifth embodiment of the invention.
Figure 16:
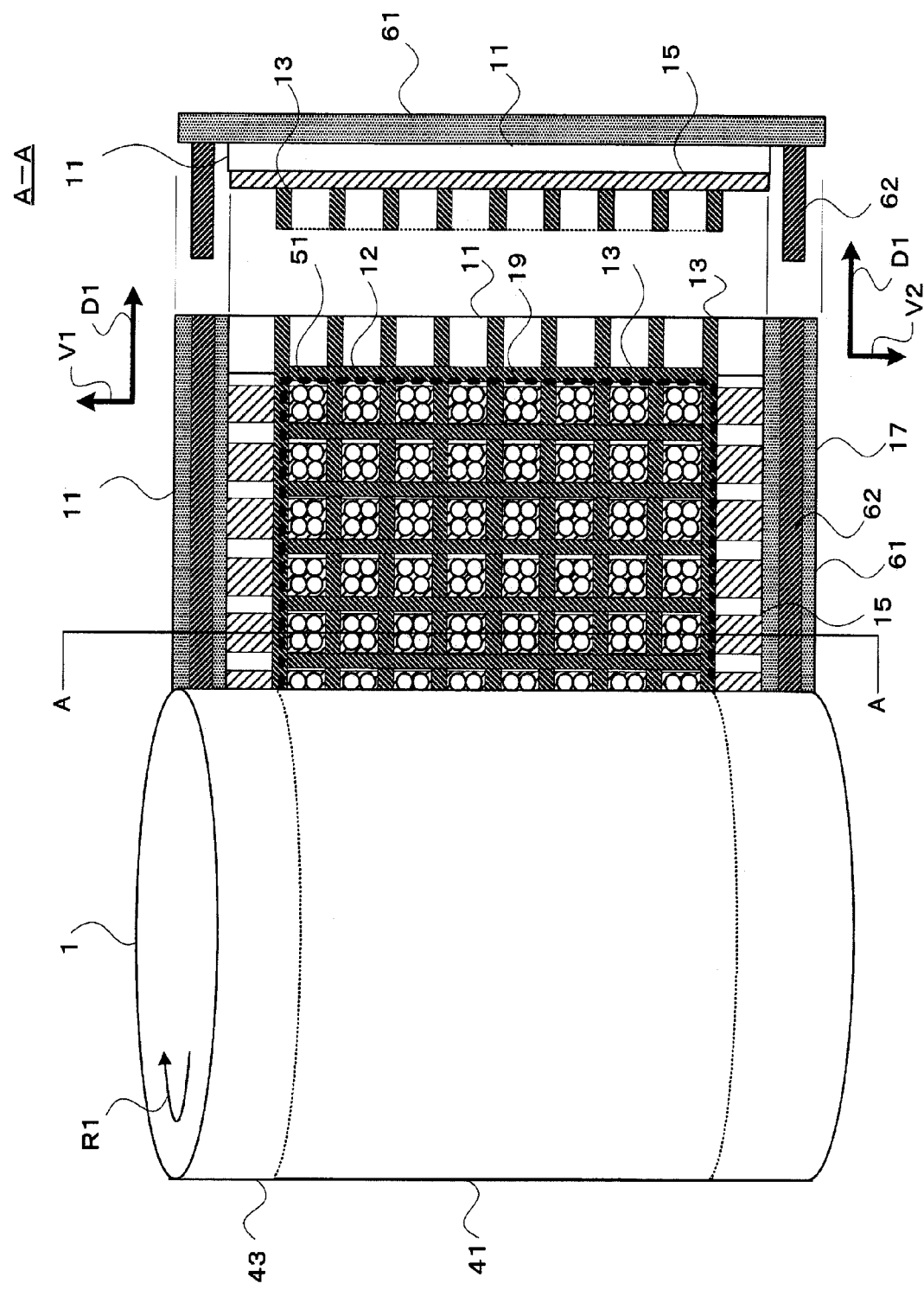
FIG. 16 presents a plan view of a transfer body and a substrate in FIG. 15 as seen from the top, and a cross-sectional view of the substrate along the line A-A.

FIG. 15 is a block diagram showing the schematic configuration of the essential portion of an apparatus for manufacturing a particle movement type display panel according to the fifth embodiment of the invention. FIG. 16 presents a plan view of a transfer body and a substrate in FIG. 15 as seen from the top, and a cross-sectional view of the substrate along the line A-A.

A transfer member 61 according to the embodiment serves to transfer the substrate 11 placed thereon during a plurality of manufacturing processes. A transfer-member side interval holding section 62 for holding an interval L4 between the transfer member 61 and the transfer body 1 is provided at both sides of the portion where the substrate 11 is to be mounted. The transfer-member side interval holding section 62 is provided in such a way as to have a height dimension L4 for holding the interval between the non-transfer area 43 and the non-display area 17 of the substrate 11 at the time of transferring the color material particles 51 from the transfer body 1 to the substrate 11 at a predetermined value L3 and to be in contact with the non-transfer area 43 of the transfer body 1. The predetermined value L4 should be set equal to or larger than the sum of the height dimension L1 of the partition wall 13, the particle size value L2 of the color material particles 51 and a thickness L6 of the substrate 11. The transfer-member side interval holding section 62 is provided successively in a predetermined pattern along the traveling direction D1 of the substrate 11. The predetermined pattern herein should include a pattern of successively providing the transfer-member side interval holding section 62 at the same height. The other configuration is the same as that of the first embodiment. As the cleaner unit 3, the charging unit 5, the electrostatic latent image writing unit 7, the developing unit 9 and the color material particles 51 are the same as those of the first embodiment, their descriptions will be omitted. Since the other configuration of the substrate 11 is the same as that of the second embodiment, its description will be omitted. As the feed roller 21, the biasing spring 23 and the power supply device 25 are also the same as those of the first embodiment, their descriptions will be also omitted.

According to the embodiment, as described above, the interval between the transfer member 61 having the substrate 11 mounted thereon and the transfer body 1 can be stabilized by providing the transfer-member side interval holding section 62 between the transfer member 61 and the transfer body 1 biasing the transfer member 61 toward the transfer body 1 (direction D2), thus making it possible to reduce the waste amount of the color material particles and enhance the resolution. Further, the height dimension of the interval holding section is set larger than the sum of the height dimension of the partition walls and the particle size value of the color material particles, so that in transferring the color material particles into each cell, it is possible to suppress the color material particles contacting the partition walls of the cell regions and falling off the cell, and deformation or damaging of the outer walls of the cell regions. According to the embodiment, the height of the substrate-side interval holding section 31 can be adjusted according to the height of the cell partition wall 13 of each substrate 11 and the particle size of the color material even in a case where the size of the cell regions 12 and the diameter of the color material particles 51 change a lot as in the case of, for example, a large item small volume production. Furthermore, the embodiment eliminates the need for providing space for the interval holding section at both horizontal portions of the substrate in the transfer direction, thus making it possible to reduce the material cost and the cut-out cost after usage or the like, and reduce the number of manufacturing processes.

While the manufacturing method and the manufacturing apparatus for the display panel according to the present invention have been described by way of embodiments, the technical scope of the invention is not limited to the scopes of the above mentioned embodiments. The invention can be adapted to display panels which use color material particles besides the particle movement type display panel. The invention can cope with both of the case where a solvent is injected in around the color material particles and the case where a solvent is not injected, and can be adapted to the case where color material particles of plural colors are supplied to a single cell region.

DESCRIPTION OF REFERENCE NUMERALS 1, 1*a*, 1*b* electrophotographic transfer body
3, 3*a*, 3*b* cleaner unit
5, 5*a*, 5*b* charging unit
7, 7*a*, 7*b* electrostatic latent image writing unit
9, 9*a*, 9*b* developing unit
11 substrate
12 cell region
13 partition wall
15 electrode
17 non-display area of substrate 11
19 display area of substrate 11
21, 21*a*, 21*b* feed roller
23 biasing spring
25 power supply device
31 substrate-side interval holding section
35 projection (on substrate side)
41 transfer area of transfer body 1
43 non-transfer area of transfer body 1
45 transfer-body-side interval holding section
51, 51*a*, 51*b* color material particles
61 transfer member
62 transfer-member side interval holding section
D1 traveling direction of substrate 11
D2 biasing direction of biasing spring 23
L1 height dimension of partition wall 13 (second height dimension)
L2 particle size value of color material particles 51
L3 height dimension of substrate-side interval holding section 31 (first height dimension)
R1 rotational direction of transfer body 1

What is claimed is:

1. A method of manufacturing a display panel with a substrate having an electrode at each of a plurality of cell regions partitioned by partition walls provided upright, the method supplying color material particles with an electrostatic property to each of the cell regions based on a supply pattern of the color material particles which is preformed on an electrophotographic transfer body, the method comprising the steps of:
   providing an interval holding section between a non-display area of a surface of the substrate and a non-transfer area of a surface of the transfer body, the interval holding section having a first height dimension for holding an interval between the non-display area and the non-transfer area at a predetermined value at a time when the transfer body transfers the color material particles to the substrate; and
   transferring the color material particles to the substrate from the transfer body while biasing at least one of the substrate and the transfer body toward the other thereof in such a way that the interval holding section holds the interval between the non-transfer area of the transfer body and the non-display area of the substrate at the predetermined value.

2. The manufacturing method according to claim 1, wherein in the step of providing the interval holding section, the first height dimension is set larger than a sum of a second height dimension of the partition walls and a value of a particle size of the color material particles.

3. The manufacturing method according to claim 1, wherein in the step of providing the interval holding section, a substrate-side interval holding section which contacts the non-transfer area of the transfer body when the transfer body transfers the color material particles to the substrate is provided at the non-display area of the substrate, and
   in the step of transferring the color material particles, the color material particles are transferred to the substrate from the transfer body while rendering the substrate-side interval holding section in contact with the non-transfer area of the transfer body.

4. The manufacturing method according to claim 3, wherein in the step of providing the substrate-side interval holding section, the substrate-side interval holding section is provided along a traveling direction of the substrate.

5. The manufacturing method according to claim 4, wherein in the step of providing the substrate-side interval holding section, the substrate-side interval holding section is provided successively at the non-display area of the substrate in a predetermined pattern.

6. The manufacturing method according to claim 4, wherein in the step of providing the substrate-side interval holding section, the substrate-side interval holding section is provided intermittently at the non-display area on the side face side of each of the cell regions which lies in a direction orthogonal to the traveling direction, at an interval equal to or larger than at least a pitch of the cell regions.

7. The manufacturing method according to claim 6, further comprising a step of providing a plurality of projections to be fitted in respective intervals of the substrate-side interval holding sections provided intermittently, at the non-transfer area of the transfer body.

8. The manufacturing method according to claim 6, wherein in the step of providing the interval holding section, a transfer-body-side interval holding section which contacts the non-display area of the substrate when the transfer body transfers the color material particles to the substrate is provided at the non-transfer area of the transfer body, and in the step of transferring the color material particles, the color material particles are transferred to the substrate from the transfer body while rendering the transfer-body-side interval holding section in contact with the non-display area of the substrate.

9. The manufacturing method according to claim 8, wherein in the step of providing the transfer-body-side interval holding section, the transfer-body-side interval holding section is provided along a traveling direction of the transfer body.

10. The manufacturing method according to claim 9, wherein in the step of providing the transfer-body-side interval holding section, the transfer-body-side interval holding section is provided successively at the non-transfer area of the transfer body in a predetermined pattern.

11. The manufacturing method according to claim 9, wherein in the step of providing the transfer-body-side interval holding section, the transfer-body-side interval holding section is provided intermittently at the non-transfer area at an interval equal to or larger than at least a pitch of the cell regions, and in the step of transferring the color material particles, the transfer-body-side interval holding sections provided intermittently are set in contact with the non-display area on a side face of each of the cell regions and in a direction orthogonal to the traveling direction.

12. The manufacturing method according to claim 11, further comprising a step of providing a plurality of projections to be fitted in respective intervals of the transfer-body-side interval holding sections provided intermittently, at the non-display area of the substrate.

13. The manufacturing method according to claim 1, wherein the color material particles with the electrostatic property have plural types of colors, different transfer bodies for different color types of the color material particles are disposed along the traveling direction of the substrate, the supply pattern is formed on a different transfer body for each of the color types in association with cell regions of the each color type on the substrate of the display panel, and the color material particles of each color type are supplied to the cell regions of the respective color type based on the supply pattern.

14. The manufacturing method according to claim 13, wherein the color material particles of at least two different colors are filled in the cell regions of the respective color types on the substrate.

15. A display panel manufactured by the manufacturing method as recited in claim 1.

16. A method of manufacturing a display panel with a substrate having an electrode at each of a plurality of cell regions partitioned by partition walls provided upright, the method supplying color material particles with an electrostatic property to each of the cell regions based on a supply pattern of the color material particles which is preformed on an electrophotographic transfer body, the method comprising the steps of:

providing an interval holding section between an off-substrate area on a transfer member and a non-transfer area of a surface of the transfer body, the interval holding section having a fourth height dimension for holding an interval between the off-substrate area on the transfer member and the non-transfer area at a predetermined value at a time when the transfer body transfers the color material particles to the substrate; and transferring the color material particles to the substrate from the transfer body while biasing at least one of the transfer member and the transfer body toward the other thereof in such a way that the interval holding section holds the interval between the non-transfer area of the transfer body and the off-substrate area on the transfer member at the predetermined value.

17. The manufacturing method according to claim 16, wherein the color material particles with the electrostatic property have plural types of colors, different transfer bodies for different color types of the color material particles are disposed along the traveling direction of the substrate, the supply pattern is formed on a different transfer body for each of the color types in association with cell regions of the each color type on the substrate of the display panel, and the color material particles of each color type are supplied to the cell regions of the respective color type based on the supply pattern.

18. A display panel manufactured by the manufacturing method as recited in claim 16.

* * * * *